(12) United States Patent
Yuen

(10) Patent No.: US 8,595,508 B2
(45) Date of Patent: Nov. 26, 2013

(54) METHOD OF SECURE ENCRYPTION

(76) Inventor: Pak Kay Yuen, Hong Kong (CN)

( * ) Notice: Subject to any disclaimer, the term of this patent is extended or adjusted under 35 U.S.C. 154(b) by 0 days.

(21) Appl. No.: 12/815,199

(22) Filed: Jun. 14, 2010

(65) Prior Publication Data

US 2010/0257368 A1 Oct. 7, 2010

Related U.S. Application Data

(62) Division of application No. 11/041,436, filed on Jan. 25, 2005, now Pat. No. 7,751,565.

(51) Int. Cl.
*G06F 21/00* (2013.01)
(52) U.S. Cl.
USPC .................................. 713/185; 726/9; 705/75
(58) Field of Classification Search
USPC ................ 713/168–173, 161, 182–185, 193; 726/9, 20, 2, 5, 10, 19; 705/65–67, 705/70–76; 340/5.81, 5.85; 235/375, 380, 235/382

See application file for complete search history.

(56) References Cited

U.S. PATENT DOCUMENTS

| | | | | |
|---|---|---|---|---|
| 3,956,615 A * | 5/1976 | Anderson et al. | ................ | 705/72 |
| 4,186,871 A * | 2/1980 | Anderson et al. | ................ | 705/71 |
| 4,707,592 A * | 11/1987 | Ware | ............................ | 235/379 |
| 5,412,730 A | 5/1995 | Jones | | |
| 5,569,897 A * | 10/1996 | Masuda | ....................... | 235/379 |
| 6,163,771 A * | 12/2000 | Walker et al. | ................... | 705/18 |
| 6,213,391 B1 * | 4/2001 | Lewis | .......................... | 235/380 |
| 6,729,539 B2 * | 5/2004 | Kim | ............................. | 235/379 |
| 7,131,583 B2 * | 11/2006 | Jaros et al. | ..................... | 235/380 |
| 7,249,076 B1 * | 7/2007 | Pendleton et al. | ............... | 705/35 |
| 2001/0034702 A1 * | 10/2001 | Mockett et al. | ................. | 705/39 |
| 2001/0034723 A1 * | 10/2001 | Subramaniam | ................ | 705/74 |
| 2001/0037454 A1 * | 11/2001 | Botti et al. | ..................... | 713/176 |
| 2002/0019781 A1 * | 2/2002 | Shooks et al. | .................. | 705/26 |
| 2002/0032662 A1 * | 3/2002 | Maclin et al. | ................... | 705/64 |
| 2002/0043566 A1 * | 4/2002 | Goodman et al. | ............. | 235/492 |
| 2002/0073045 A1 * | 6/2002 | Rubin et al. | .................... | 705/65 |
| 2002/0088852 A1 * | 7/2002 | Ohta et al. | .................... | 235/381 |

(Continued)

FOREIGN PATENT DOCUMENTS

| | | |
|---|---|---|
| CN | 1527531 | 9/2004 |
| JP | 2004-347885 | 12/2004 |
| WO | WO0195204 | * 12/2001 |
| WO | WO 02/41566 A2 | 5/2002 |

OTHER PUBLICATIONS

Li, (Yingjui Li, Xinwen Zhang, A security-Enhanced One-Time Payment Scheme for Credit Card, Proceeding of the 14th International Workshop on Research Issues on Data Enigneering: Web Servbices for E-Commercie and E-Government Applications (RIDE'04 0-7695-2095-2/04, 2004 IEEE).*

(Continued)

*Primary Examiner* — Nirav B Patel

(57) ABSTRACT

A system, device and method for encrypting plaintext information securely. The system includes a transmitting agent to generate and synchronize a first cipher stream using the plaintext information and a first key, to generate and synchronize a second cipher stream using a second key and a randomizing function to randomize and synchronize a controllable plaintext stream to form a second synchronized cipher stream, and to operate on the plurality of first and second cipher streams using an exclusive disjunction operator to obtain a ciphertext stream; and a receiving agent to decrypt the ciphertext stream.

1 Claim, 20 Drawing Sheets

(56) References Cited

U.S. PATENT DOCUMENTS

| | | | |
|---|---|---|---|
| 2002/0194137 A1* | 12/2002 | Park et al. | 705/64 |
| 2003/0121969 A1* | 7/2003 | Wankmueller | 235/379 |
| 2003/0149869 A1 | 8/2003 | Gieichauf | |
| 2004/0139235 A1 | 7/2004 | Rashid et al. | |

OTHER PUBLICATIONS

Wikipedia, "Magnetic stripe card", Feb. 2005 found at http://web.archive.org/web/20050213115401/http://en.wikipedia.org/wiki/Magnetic_stripe_card.*

*Federal Information Processing Standards Publication* 197, Nov. 26, 2001, "Announcing the Advanced Encryption Standard (AES)", 51 pages.

U.S. Appl. No. 11/041,436, filed Jan. 25, 2005, Pak Kay Yuen.

International Preliminary Report on Patentability, mailed Jun. 7, 2007 and issued in corresponding International Patent Application No. PCT/CN2006/000086.

PCT Written Opinion of the International Searching Authority, dated Mar. 16, 2006.

Office Action (Restriction) mailed Sep. 3, 2008, U.S. Appl. No. 11/041,436.

Non-final office action mailed Aug. 24, 2009, U.S. Appl. No. 11/041,436.

Notice of Allowance mailed Mar. 1, 2010, U.S. Appl. No. 11/041,436.

Supplemental Notice of Allowability mailed Mar. 22, 2010, U.S. Appl. No. 11/041,436.

* cited by examiner

METHOD OF SECURE ENCRYPTION

CROSS-REFERENCE TO RELATED APPLICATIONS

This application is a divisional application of Application Ser. No. 11/041,436, filed on Jan. 25, 2005, now U.S. Pat. No. 7,751,565, the entire contents of which are incorporated by reference herein.

BACKGROUND

1. Field

This invention relates generally to a system, device and method of securely encrypting plaintext (a readable message) information, and more particularly, to a system, device and method of encrypting information to prevent unauthorized access to the encrypted information using an internal synchronous mechanism.

2. Description of the Related Art

A process to transform a readable information (plaintext P) to an un-readable format using a password (or key K) is regarded as encryption, and decryption is the reverse process of the encryption. The entire process of encryption and decryption or system is often regarded as "cipher." When a single key is used for both encryption and decryption, the cipher is called a symmetric-key cipher (or scheme) as illustrated in FIG. 1, numeral 100. Symmetric-key ciphers are generally categorized as being either block ciphers or stream ciphers.

As illustrated in FIG. 2, numeral 200, a general block cipher operates on one block of plaintext characters at a time using a same key on each block. Most of the encryption methods in use today are block ciphers, e.g., Data Encryption Standard (DES), Triple Data Encryption Standard (Tri-DES), CAST, International Data Encryption Algorithm (IDEA), Blowfish/TwoFish, and Advanced Encryption Standard (AES). Symmetric-key ciphers (block or stream) may be classified by block and key lengths. For example, Tri-DES cipher is a 64-Bit block cipher with 168-Bit key-length and may be written as Tri-DES(64:168). Similarly, other ciphers may be expressed as: CAST-128(64:128), RC4(1:var), Blowfish(64:var) and AES(var:var). When a same key is used on each plaintext block Pi, a so-called "Block Effect" occurs, i.e., a same plaintext block will always generate the same ciphertext block Ci. In order to eliminate or reduce the block effect, a number of feedback mechanisms called "Operation Modes" may be used.

For example: the Electronic Code Book (ECB) Mode is illustrated in FIG. 3, numeral 300, wherein each plaintext block $P_1$ 302, $P_2$ 304, and $P_3$ 306 is encrypted to form a ciphertext block $C_1$, $C_2$ and $C_3$, respectively. The Cipher Block Chaining (CBC) Mode is illustrated in FIG. 4, numeral 400, wherein plaintext block $P_1$ 402 and ciphertext block $C_0$ 408, and similarly, a combination of plaintext block $P_2$ 404 and ciphertext block $C_1$ 412 and separately a combination of plaintext block $P_3$ 406 and ciphertext block $C_2$ 414, are operated on by an exclusive disjunction operator XOR 418, undergo encryption in block E 410 and generate ciphertext blocks $C_1$ 414, $C_2$ 414 and $C_3$ 416, respectively.

The Cipher Feedback (CFB) Mode is illustrated in FIG. 5, numeral 500, wherein a ciphertext block $C_0$ 512 undergoes encryption in block E 508, is operated on, together with a plaintext block $P_1$ 502, by an exclusive disjunction operator XOR 510 to generate a ciphertext block $C_1$ 514. Similarly, ciphertext block $C_1$ 514 undergoes encryption in block E 508, is operated on, together with a plaintext block $P_2$ 504, by an exclusive disjunction operator XOR 510 to generate a ciphertext block $C_2$ 516, and ciphertext block $C_2$ 516 undergoes encryption in block E 508, is operated on, together with a plaintext block $P_3$ 506, by an exclusive disjunction operator XOR 510 to generate a ciphertext block $C_3$ 518.

The Output Feedback (OFB) Mode is illustrated in FIG. 6, numeral 600, wherein a ciphertext block $C_0$ 612 undergoes encryption in block E 610, an output of same is: (1) operated on, together with a plaintext block $P_1$ 602, by an exclusive disjunction operator XOR 608 to generate a ciphertext block $C_1$ 614 and (2) input to a next encryption block 610, undergoes encryption in the next block E 610, and an output of same is: (3) operated on, together with a plaintext block $P_2$ 604, by a next exclusive disjunction operator XOR 608 to generate a ciphertext block $C_2$ 616 and (4) input to a next encryption block 610, undergoes encryption in the next block E 610, and an output of same is: (5) operated on, together with a plaintext block $P_3$ 606, by a next exclusive disjunction operator XOR 608 to generate a ciphertext block $C_3$ 618, and continues in the same fashion.

In general, when the block-length of a block cipher is reduced to one, the cipher is similar to encrypting a stream of individual characters, and therefore is also classified as a stream cipher. Given a plaintext stream, a typical encryption process for a stream cipher is to generate an arbitrary long string from the key K called "key-stream". The key-stream is then used to perform a bitwise XOR operation with the plaintext character-by-character producing the ciphertext.

As illustrated in FIG. 7, numeral 700, encryption 702 using stream ciphers operates 710 on a single character of the plaintext 708 at a time using a stream of encryption characters called "Key-Stream" 706 to form ciphertext 712, which, when received, undergoes a decryption process 704 in which the keystream 714 is applied to a reverse encryption process 716 to provide the plaintext 718. In order to create a keystream, a feedback mechanism is employed so that the key is constantly changing. Some of the stream ciphers presently in use are: RC4 (a stream cipher designed by Rivest for RSA Data Security (now RSA Security), which is a variable key-size stream cipher with byte-oriented operations based on the use of a random permutation); ISAAC (Internet Security, Applications, Authentication and Cryptography), which is useful as a stream cipher, for simulations, and as a general purpose pseudorandom number generator); and SEAL (Software-optimized Encryption Algorithm), which is a fast stream cipher for 32-bit machines designed by Rogaway and Coppersmith.

Stream ciphers are usually divided into two categories designated "Synchronizing" and "Self-Synchronizing." When the generated key-stream of a stream cipher is independent of the plaintext and ciphertext, it is called a "Synchronizing" stream cipher. The key-stream of a synchronized stream cipher generally depends on the key only. One characteristic of these ciphers is that both the sending and receiving ends must be synchronized. In other words, as long as the same key and the same position of the key-stream are used, the decryption is well-defined and proceeds accordingly. In particular, when the key-stream and the plaintext are XORed in binary level (or bits) to produce the binary ciphertext, the synchronized stream cipher is called a binary additive stream cipher. Binary additive stream ciphers are popular in industry. The structure of the cipher is non-complex. For example, any suitable pseudo-random number generator may be used with an input key to generate a sequence of random bits. Most of the practical and commercial stream ciphers are binary additive stream ciphers.

When the generated key-stream is a function of the key and some parts of previous ciphertext, the stream cipher is called "Self-Synchronizing." Using part of the ciphertext data for encryption is used to eliminate block effects for a block cipher. For this reason, the Cipher Feedback Mode (CFB) may be modified easily to operate as a stream cipher by employing encryption only in the cipher to produce the same key-stream. The modifications of the Cipher Feedback Mode (CFB) to perform encryption and decryption as a stream cipher are illustrated in FIGS. 8 and 9.

The block cipher is used to generate a same key-stream. For encryption in the CFB mode, as illustrated in FIG. 8, numeral 800, a block $b_i$ 806 is sent to the block cipher E 802 to generated a cipher block $e_i$ 804. The $e_i$ 804 is then split represented as a keystream $\{ko, \ldots, kn\}$ 808. Together with a section of plaintext stream $\{po, \ldots, pn\}$ 810, the XOR operation 812 is carried out and generates a section of the ciphertext stream $\{co, \ldots, cn\}$ 804. This section 814 is grouped into a block and is fed back to the block cipher $b_i$ 806 for a next encryption implementation.

For decryption in the CFB mode, as illustrated in FIG. 9, numeral 900, a section of the ciphertext stream 912 is converted into a block for the block cipher encryption. Since the same block 906 is input to the block cipher E 902, the same output $e_i$ 904 is obtained. The $e_i$ 904 is then represented as a section of the key-stream $\{ko, \ldots, kn\}$ 908. This key-stream 908 is XORed with the ciphertext stream $\{co, \ldots, cn\}$ 912 to produce the plaintext block 910. Again, the same plaintext section $\{po, \ldots, pn\}$ 910 is obtained because the same key-stream is used.

The "Output Feedback Mode (OFB)" of a block cipher is independent of the ciphertext or plaintext and may be used to implement a synchronous stream cipher. As illustrated in FIG. 10, numeral 1000, in OFB mode encryption, a user key may be considered as a block $b_i$ 1008 and may be input to the block cipher E 1006. The result is a block $e_i$ 1012. Block $e_i$ 1012 is converted into a key-stream $\{ko, \ldots, kn\}$ 1002, and the key-stream $\{ko, \ldots, kn\}$ 1002 is XORed 1014 with the plaintext stream $\{po, \ldots, pn\}$ 1004 to produce the ciphertext stream $\{co, \ldots, cn\}$ 1010. To obtain a next section of the key-stream, the block $e_i$ 1012 is fed back into the block cipher E 1006 again.

As illustrated in FIG. 11, numeral 1100, for the decryption process, a same block $b_i$ 1108 (e.g., the user key) is input to the block cipher E 1106 to produce $e_i$ 1104. The same key-stream $\{ko, \ldots, kn\}$ 1102 is generated. An XOR operation 1112 is performed on key-stream $\{ko, \ldots, kn\}$ 1102 and ciphertext stream $\{co, \ldots, cn\}$, and a same plaintext stream $\{po, \ldots, pn\}$ 1110 is obtained.

However, none of the conventional block and stream ciphers provide a secure encryption scheme.

SUMMARY

In accordance with an aspect of the present invention, a system encrypts plaintext information securely and includes a transmitting agent to generate and synchronize a first cipher stream using the plaintext information and a first key, to generate and synchronize a second cipher stream using a second key and a randomizing function to randomize a controllable plaintext stream to form a second synchronized cipher stream, and to operate on the plurality of first and second cipher streams using an exclusive disjunction operator to obtain a ciphertext stream; and a receiving agent to decrypt the ciphertext stream.

The transmitting agent may include a central processing unit, a memory and a transceiver coupled to process the plaintext information and, where desired, decrypt a received ciphertext stream.

In accordance with an aspect of the present invention, the transceiver may transmit the ciphertext stream and the controllable plaintext stream to the receiving agent separately.

The system may include a data entry station and a database server linked via a Wide Area Network/Local Area Network or a combination thereof.

In accordance with an aspect of the present invention, a device encrypts plaintext information securely, and includes a data entry station. The data entry station may include a first cipher stream generator generating and synchronizing a first cipher stream using the plaintext information and a first key; a second cipher stream generator generating and synchronizing a second cipher stream using a second key and a randomizing function to randomize and synchronize a controllable plaintext stream; and an exclusive disjunction operator operating on the first and second synchronized cipher streams to obtain a ciphertext stream.

The first cipher stream generator may include a block cipher encryption unit arranged to generate and synchronize the first cipher stream upon input of the plaintext information and the first key, wherein the block cipher encryption unit includes one of a block cipher encryption device to generate the first cipher stream and a first synchronization unit to synchronize the first cipher stream; or a block cipher encryption/synchronization unit that generates and synchronizes the first cipher stream.

The second cipher stream generator may include a random function generator arranged to randomize, then synchronize, the controllable plaintext stream upon input of the second key and the controllable plaintext stream to output the second cipher stream, wherein the random function generator includes one of: a random function generator device to randomize the controllable plaintext stream and a second synchronization unit to synchronize the randomized second cipher stream; or a random function generator/synchronization unit that randomizes and then synchronizes the second cipher stream.

The exclusive disjunction operator may be an exclusive OR logical operator.

In accordance with an aspect of the present invention, a method encrypts plaintext information securely by generating and synchronizing a first cipher stream using the plaintext information and a first key; generating and synchronizing a second cipher stream using a second key and a randomizing function to randomize a controllable plaintext stream to form a second cipher stream; and operating on the plurality of synchronized first and second cipher streams using an exclusive disjunction operator to obtain a ciphertext stream.

In accordance with an aspect of the present invention, a method encrypts plaintext information securely by using an exclusive disjunction operator to generate a ciphertext stream from a first cipher stream generated and synchronized from the plaintext information and a first key, and a second cipher stream randomized and then synchronized from a controllable plaintext stream using a second key.

In accordance with an aspect of the present invention, a method encrypts plaintext information securely by generating a plurality of synchronized cipher streams, wherein at least a first cipher stream is generated and synchronized by encrypting plaintext information using a first keyword and at least a second cipher stream is generated and synchronized by a random function operating on a controllable plaintext and a second keyword; and operating on the synchronized plurality of cipher streams using an exclusive disjunction operator to obtain a ciphertext stream.

In accordance with an aspect of the present invention, a computer readable medium has recorded thereon computer readable instructions to encrypt plaintext information securely, wherein the computer readable instructions include generating and synchronizing a first cipher stream using the plaintext information and a first key; randomizing and then synchronizing a second cipher stream formed from a controllable plaintext stream using a second key and a randomizing function; and operating on the synchronized plurality of first and second cipher streams using an exclusive disjunction operator to obtain a ciphertext stream.

In accordance with an aspect of the present invention, a computer readable medium has recorded thereon computer readable instructions to encrypt plaintext information securely, wherein the computer readable instructions include using an exclusive disjunction operator to generate a ciphertext stream from: a first cipher stream generated and synchronized from the plaintext information and a first key, and a second cipher stream randomized and then synchronized from a controllable plaintext stream using a second key and a randomizing function.

In accordance with an aspect of the present invention, a computer readable medium has recorded thereon computer readable instructions to encrypt plaintext information securely, wherein the computer readable instructions include generating a synchronized plurality of cipher streams, wherein at least a first synchronized cipher stream is generated by encrypting plaintext information using a first keyword and at least a second synchronized cipher stream is generated by a random function operating on a controllable plaintext and a second keyword; and operating on the synchronized plurality of cipher streams using an exclusive disjunction operator to obtain a ciphertext stream.

In accordance with an aspect of the present invention, a method of encrypting plaintext information securely in a credit card includes selecting, by a server/database record, a plaintext P based on user information when a user applies for an account; generating, by the server/database record a first key, a second key and a controllable plaintext stream according to requirements of the user and/or a company providing the credit card; using, by the server/database record, the plaintext, the first key, the second key, and the controllable plaintext stream to perform encryption to produce a ciphertext C; inserting information of the plaintext, the first key, the controllable plaintext stream and the a first ciphertext stream into the credit card; inserting information of the plaintext, the second key, the controllable plaintext stream, and a second ciphertext stream into the cardholder database record; and encrypting the plaintext into ciphertext in accordance with a predetermined scheme utilizing the first key, the second key, and the controllable plaintext stream.

At least one of the strings of the plaintext, the ciphertext and the controllable plaintext string may be split.

In accordance with an aspect of the present invention, a method of encrypting plaintext information securely includes assigning a first keyword K1, a second keyword K2, a controllable plaintext stream F, and a randomizing function R to user input; sending K1, K2, F and R to a receiving agent via a secure mode; and encrypting a plaintext stream using K1, K2, F and R in accordance with a predetermined scheme to form a ciphertext stream and transmitting the ciphertext stream to the receiving agent.

Encrypting a plaintext stream using K1, K2, F and R in accordance with a predetermined scheme may include using a block cipher and K1 to convert the plaintext stream into a first cipher stream; randomizing F using R to form a second cipher stream; synchronizing the first cipher stream and the second cipher stream; and operating on the synchronized first and second cipher streams using an exclusive disjunction operator to obtain a ciphertext stream.

In accordance with an aspect of the present invention, a vector function may be used to provide header information to the ciphertext stream from the synchronized first cipher stream.

In accordance with an aspect of the present invention, a vector function may be used to operate on the synchronized second cipher stream to provide header information to the ciphertext stream.

In accordance with an aspect of the present invention, a method of decrypting plaintext information encrypted as noted above may include using K1, K2, F and R in a reverse process to decrypt the ciphertext stream.

The method may be implemented in one of the following transactions: a credit card transaction, a cash machine transaction, a charging transaction on the Internet, or an on-line banking transaction.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawing of which.

DETAILED DESCRIPTION OF EMBODIMENTS

Reference will now be made in detail to embodiments of the present invention.

Figure 1:
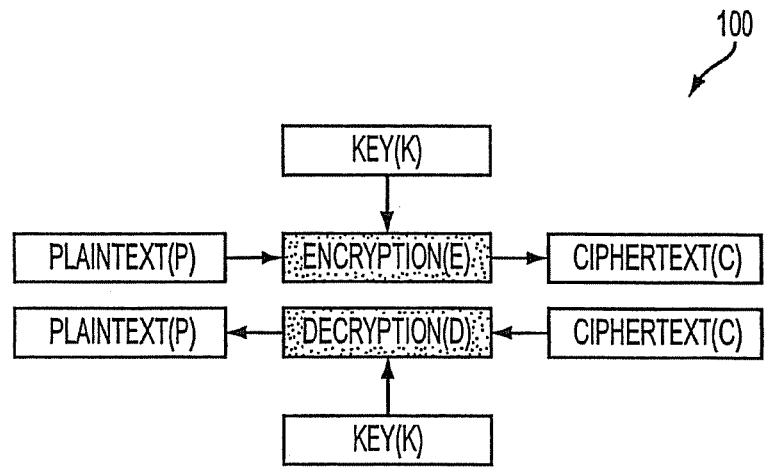
FIG. 1 is a block diagram representation of a conventional symmetric-key cipher.
Figure 2:
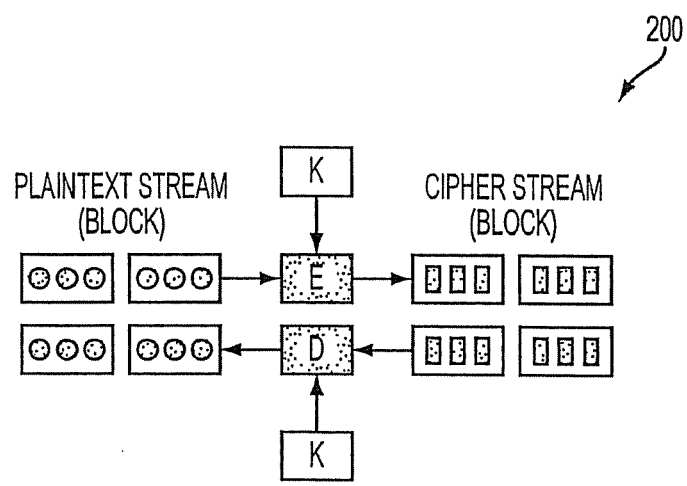
FIG. 2 is a block diagram representation of a conventional block cipher.
Figure 3:
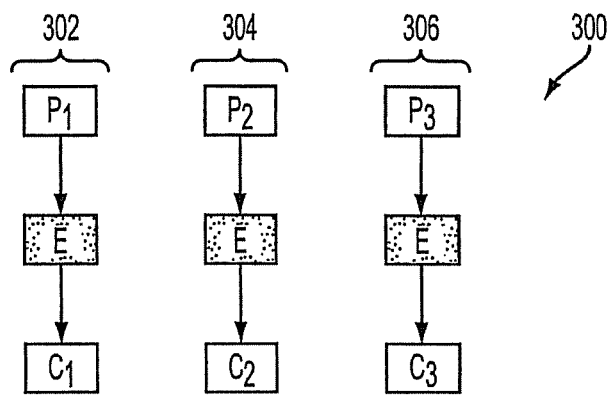
FIG. 3 is a block diagram representation of a conventional Electronic Code Book (ECB) Mode.
Figure 4:
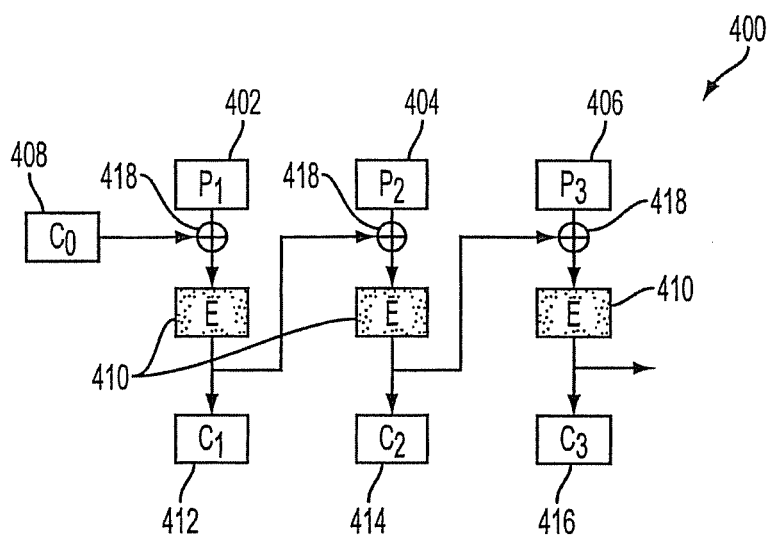
FIG. 4 is a block diagram representation of a conventional Cipher Block Chaining (CBC) Mode.
Figure 5:
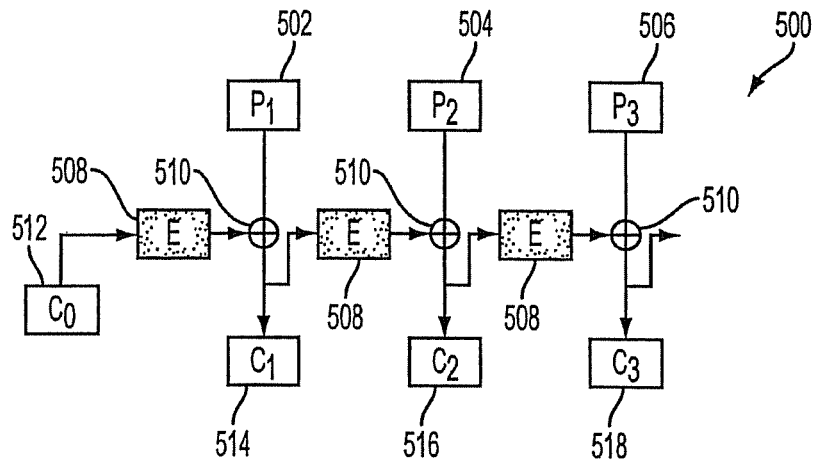
FIG. 5 is a block diagram representation of a conventional Cipher Feedback (CFB) Mode.
Figure 6:
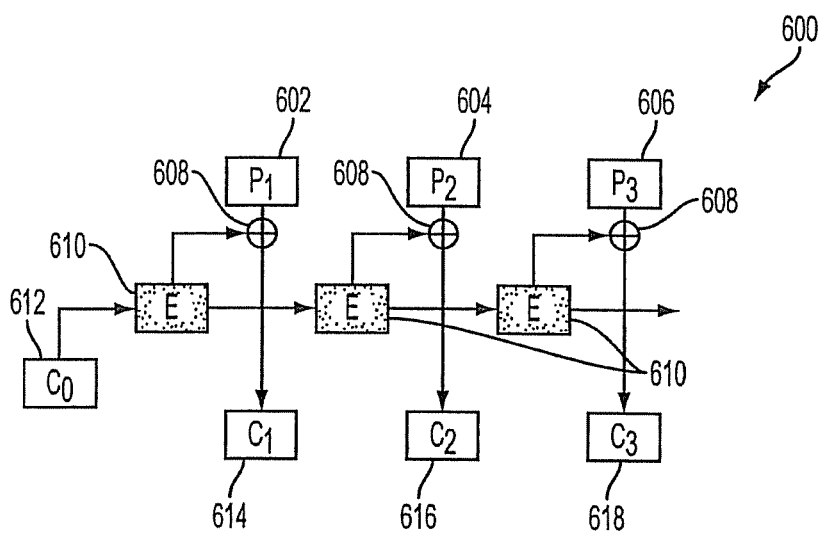
FIG. 6 is a block diagram representation of a conventional Output Feedback (OFB) Mode.
Figure 7:
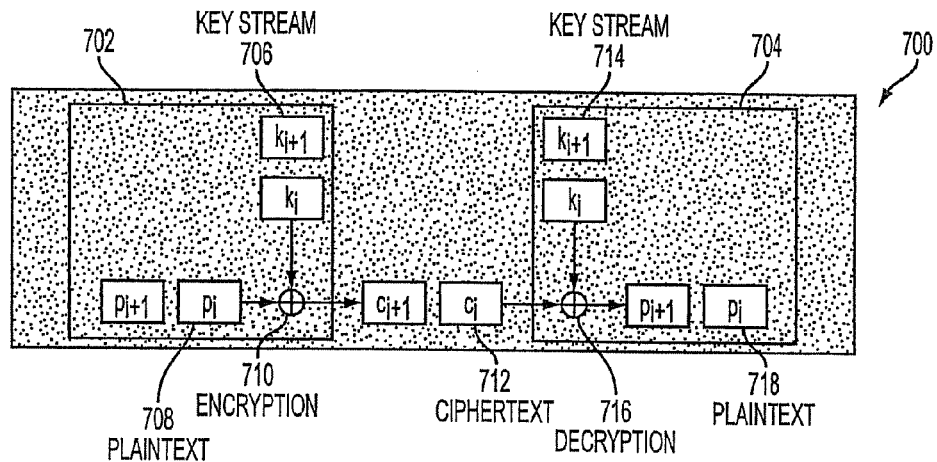
FIG. 7 is a block diagram representation of a conventional Output Feedback (OFB) Mode.
Figure 8:
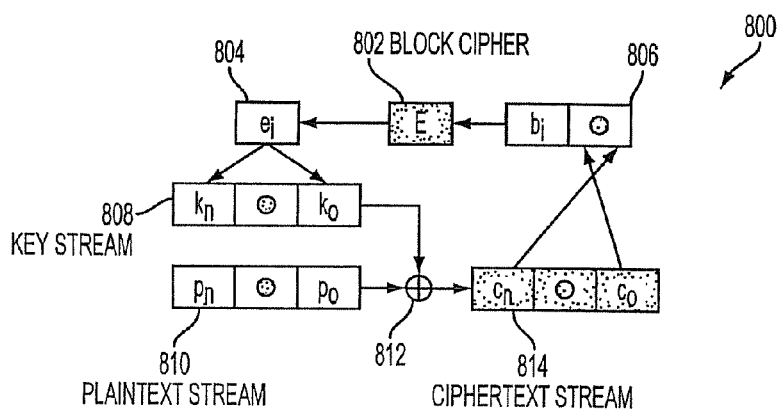
FIG. 8 is a block diagram representation of conventional encryption in the CFB mode.
Figure 9:
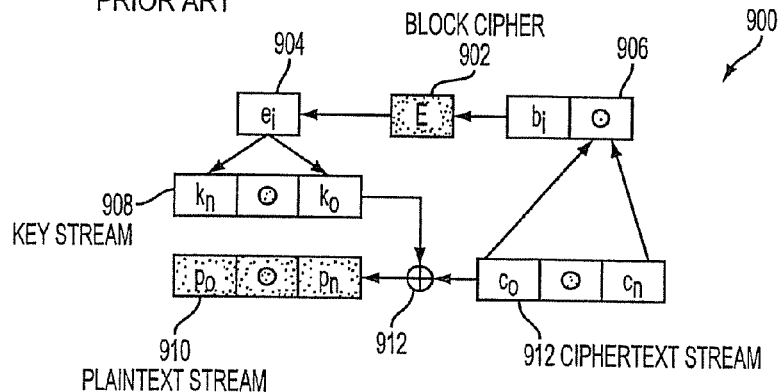
FIG. 9 is a block diagram representation of conventional decryption in the CFB mode.
Figure 10:
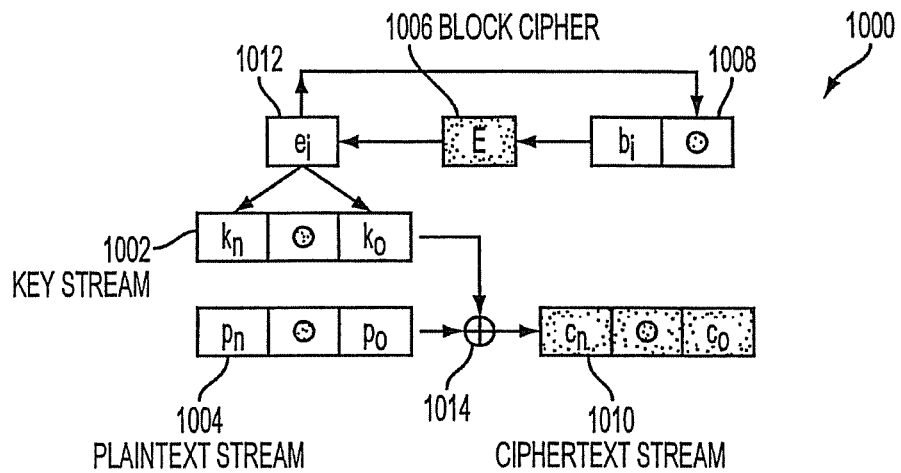
FIG. 10 is a block diagram representation of using a conventional Output Feedback Mode of a block cipher to implement a synchronous stream cipher in encryption.
Figure 11:
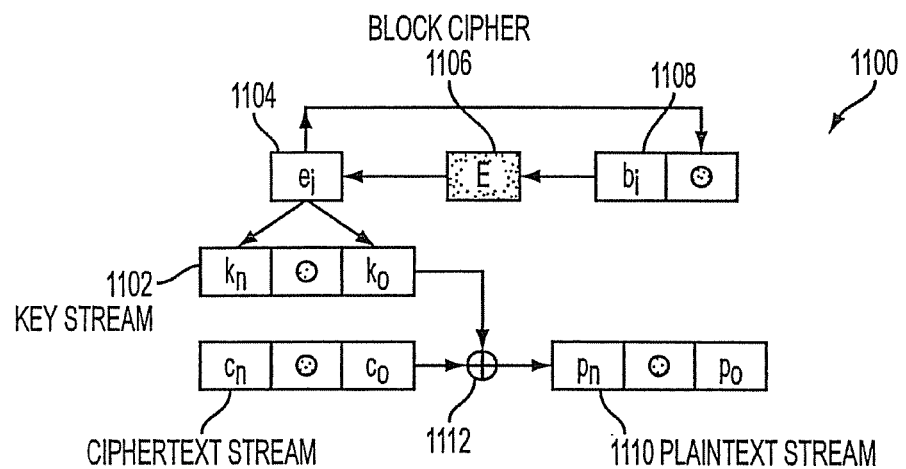
FIG. 11 is a block diagram representation of using a conventional Output Feedback Mode of a block cipher to implement a synchronous stream cipher in decryption.
Figure 12A:
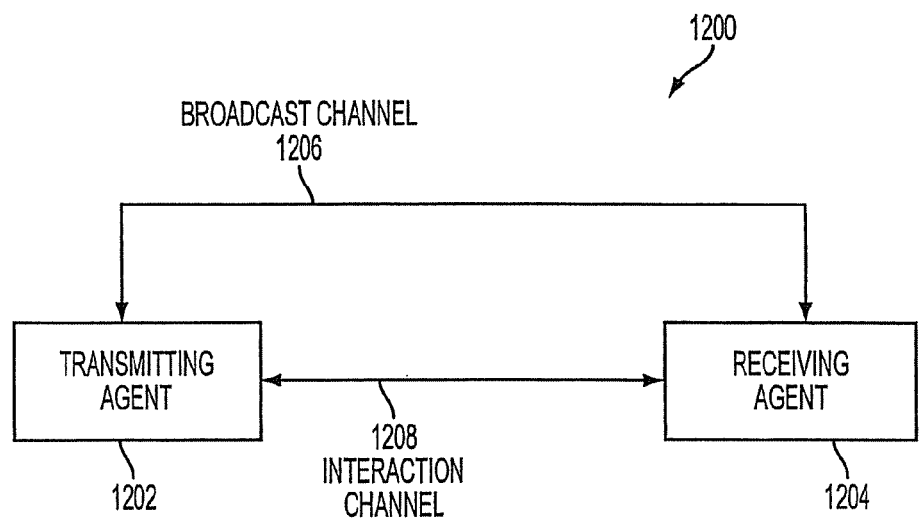
FIGS. 12A-12B are block diagrams representation of a system of encrypting plaintext information securely in accordance with two embodiments of the present invention.

In accordance with the preferred embodiments of the present invention, as illustrated in FIG. 12A, numeral 1200, a system of encrypting plaintext information securely comprises a transmitting agent 1202 and a receiving agent 1204, which communicate using a broadcast channel 1206 and/or an interaction channel 1208. That is, communication may be accomplished in a wireless or wired fashion. The transmitting agent 1202 generates and synchronizes a first cipher stream using the plaintext information and a first key, generates and synchronizes a second cipher stream using a second key and a randomizing function to randomize a controllable plaintext stream to form a second synchronized cipher stream; and operates on the plurality of first and second cipher streams using an exclusive disjunction operator to obtain a ciphertext stream. The receiving agent 1204 decrypts the ciphertext stream in a reverse fashion.

Figure 12B:
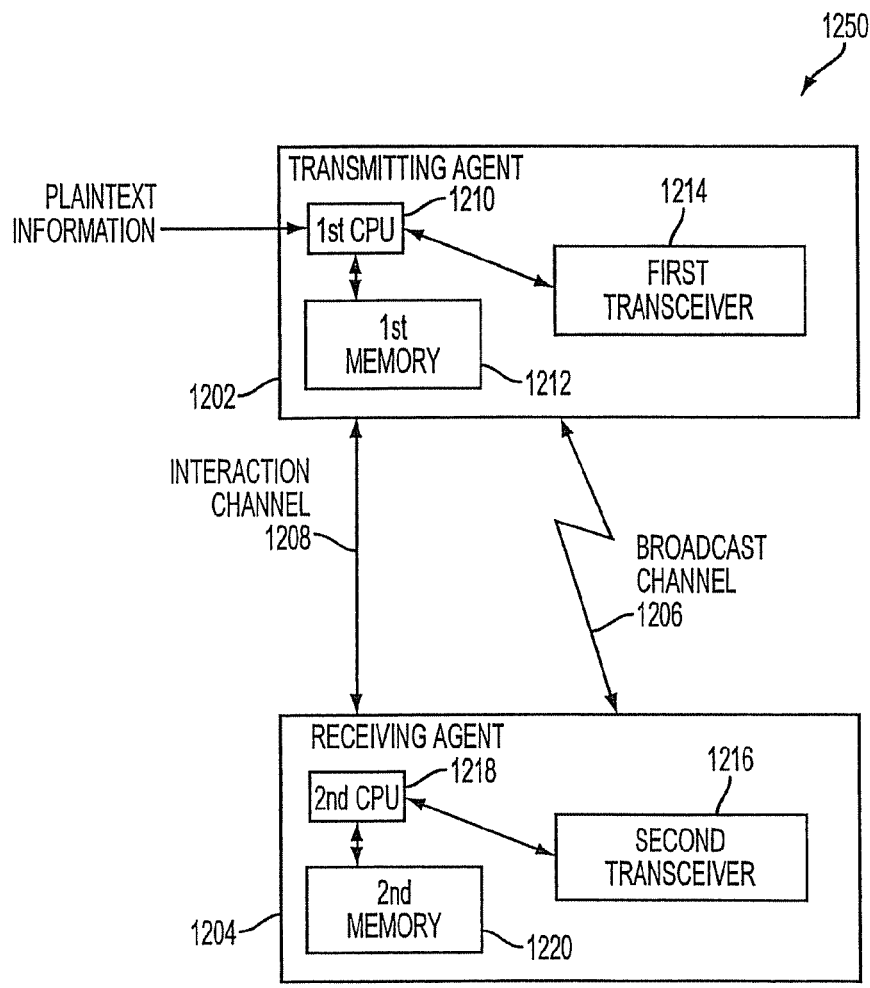

In one embodiment of the present invention, illustrated in FIG. 12B, numeral 1250, the transmitting agent 1202 comprises a first central processing unit CPU 1210, a first memory 1212 and a first transceiver 1214 coupled to process the plaintext information and, where desired, to decrypt a received ciphertext stream. The first transceiver 1214 further sends the ciphertext stream to the receiving agent 1204. The receiving agent 1204 generally comprises a second transceiver 1216, a second central processing unit CPU 1218 and a second memory 1220 coupled to process received ciphertext streams, to process plaintext information and to send a ciphertext stream of the processed plaintext information to the transmitting agent 1202. Generally, the first transceiver 1214 transmits the ciphertext stream and the controllable plaintext stream to the receiving agent separately.

Figure 13:
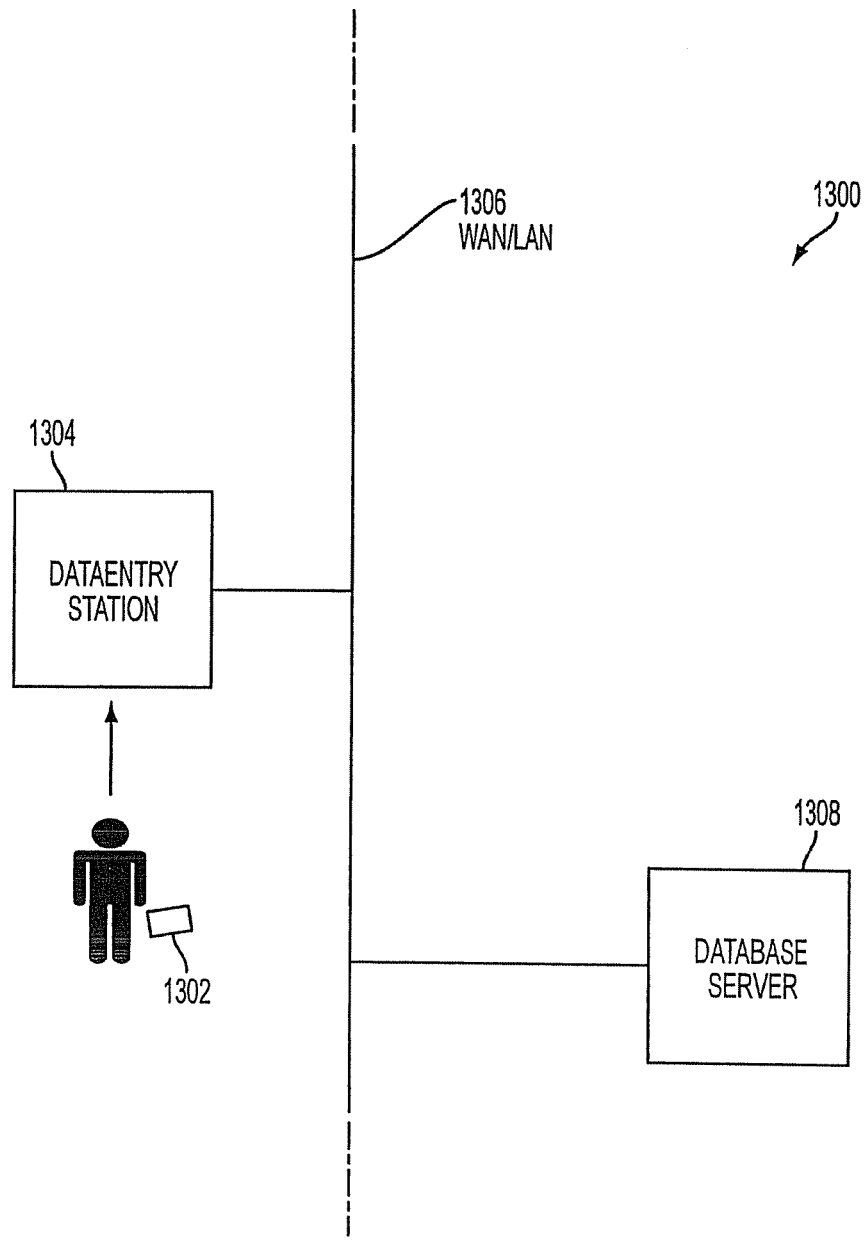
FIG. 13 is a schematic representation of a system of encrypting plaintext information securely in accordance with another embodiment of the present invention.

As illustrated FIG. 13, numeral 1300, in one embodiment of the present invention, the system comprises a data entry station 1304 and a database server 1308 linked via a Wide Area Network/Local Area Network or a combination thereof. For example, the user may insert a credit card 1302 into the data entry station 1304 to provide predetermined data, as is described more fully below.

Figure 14:
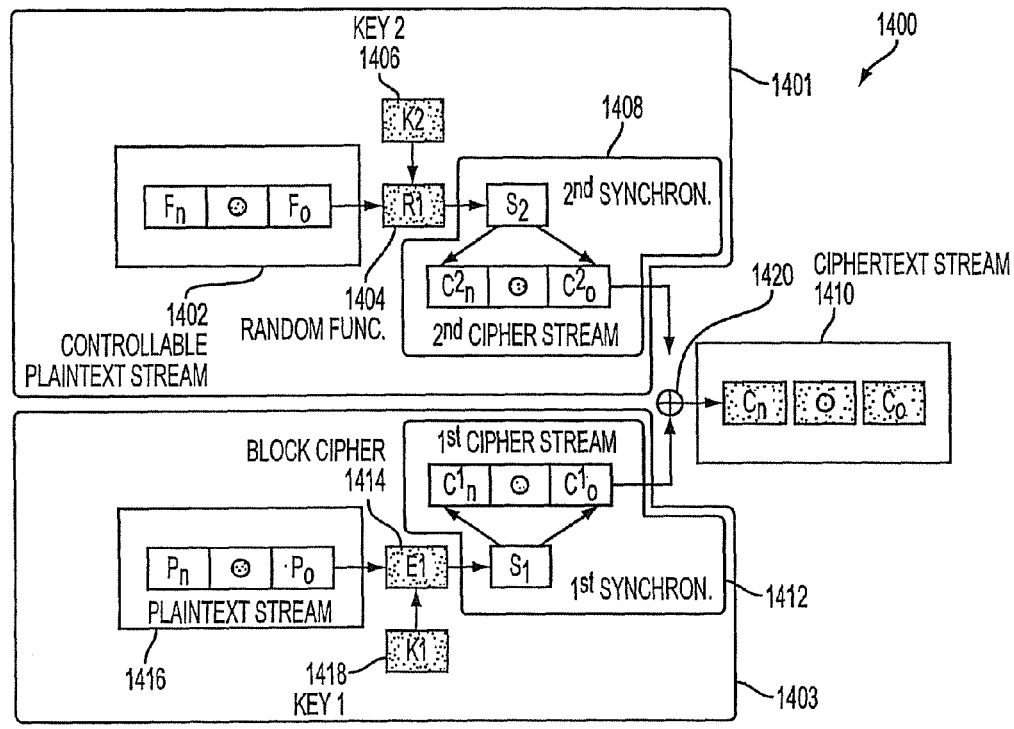
FIG. 14 is a block diagram representation of a device/data entry station to encrypt plaintext information securely in accordance with an embodiment of the present invention.

As illustrated in FIG. 14, numeral 1400, the device/data entry station 1400 may comprise a first cipher stream generator 1403 generating and synchronizing a first cipher stream using the plaintext information 1416 and a first key 1418; a second cipher stream generator 1401 generating and synchronizing a second cipher stream using a second key 1406 and a randomizing function 1404 to randomize and then synchronize a controllable plaintext stream 1402; and an exclusive disjunction operator 1420 operating on the first and second synchronized cipher streams to obtain a ciphertext stream 1410.

In one embodiment, the first cipher stream generator 1403 comprises a block cipher encryption unit E1 1414 that is arranged to generate and synchronize the first synchronized cipher stream upon input of the plaintext information 1416 and the first key K1 1418, wherein the block cipher encryption unit comprises one of: a block cipher encryption device E1 1414 to generate the first cipher stream and a first synchronization unit S1 1412 to synchronize the first cipher stream; or a block cipher encryption/synchronization unit 1414,1412 that generates and synchronizes the first synchronized cipher stream.

In one embodiment, the second cipher stream generator comprises a random function generator arranged to randomize, then synchronize, the controllable plaintext stream 1402 upon input of the second key K2 1406 and the controllable plaintext stream 1402 to output the second synchronized cipher stream, wherein the random function generator comprises one of: a random function generator device R1 1404 to randomize the controllable plaintext stream and a second synchronization unit S2 1408 to synchronize the randomized second cipher stream; or a random function generator/synchronization unit R1 1404, 1408 that randomizes and then synchronizes the second cipher stream. The exclusive disjunction operator is generally an exclusive OR logical operator.

Figure 34:
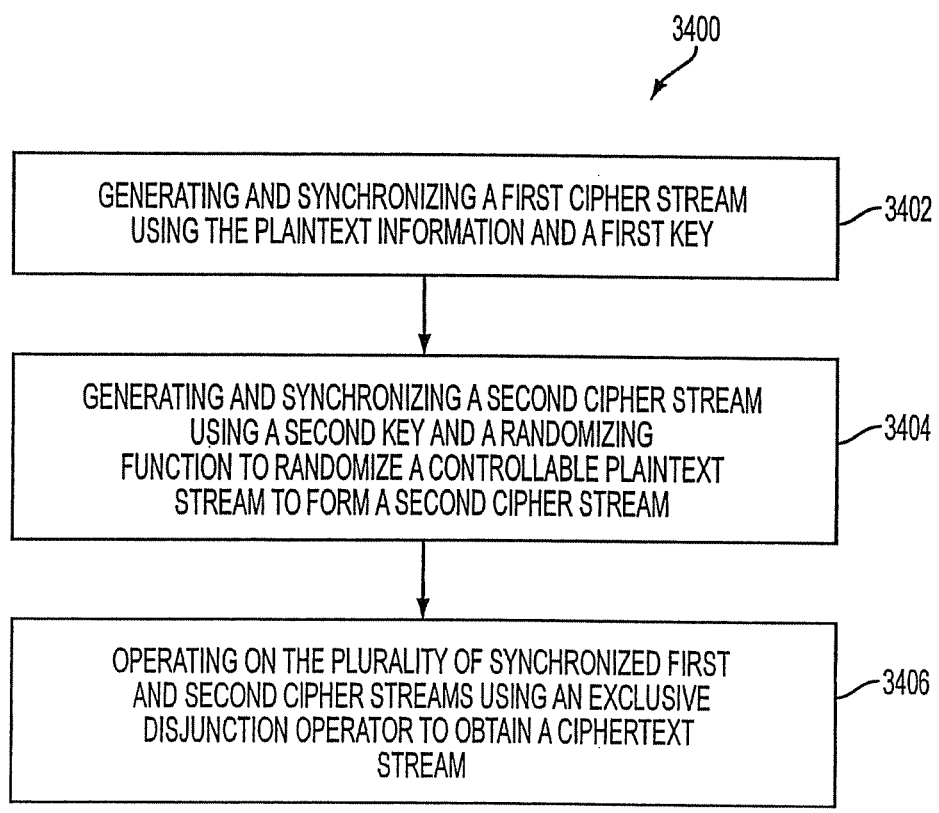
FIG. 34 is a flow chart illustrating operations in accordance with a method/computer readable medium with computer executable instructions of the present invention.

As illustrated in FIG. 34, numeral 3400, in one embodiment of the present invention, the method/computer readable medium with computer executable instructions 3400 to encrypt plaintext information securely includes the operations of generating and synchronizing a first cipher stream using the plaintext information and a first key 3402; generating and synchronizing a second cipher stream using a second key and a randomizing function to randomize a controllable plaintext stream to form a second cipher stream 3404; and operating on the plurality of synchronized first and second cipher streams using an exclusive disjunction operator to obtain a ciphertext stream 3406.

Figure 35:
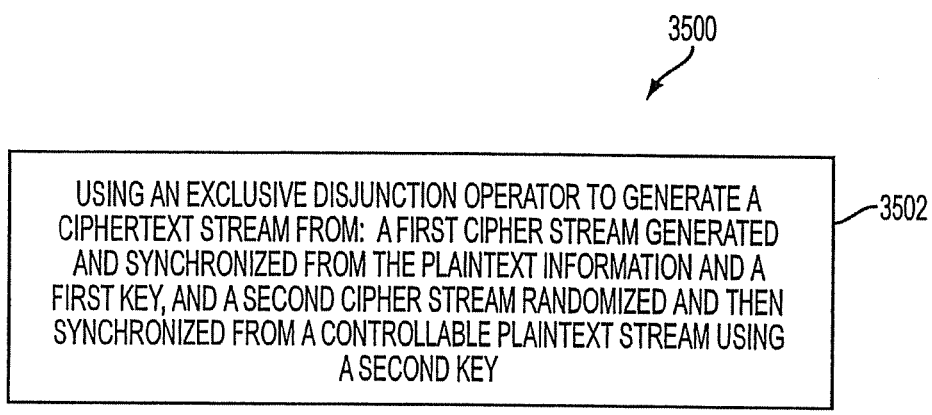
FIG. 35 is a flow chart illustrating operations in accordance with another method/computer readable medium with computer executable instructions of the present invention.

As illustrated in FIG. 35, numeral 3500, in one embodiment of the present invention, the method/computer readable medium with computer executable instructions 3500 to encrypt plaintext information securely includes using an exclusive disjunction operator 3502 to generate a ciphertext stream from: a first cipher stream generated and synchronized from the plaintext information and a first key, and a second cipher stream randomized and then synchronized from a controllable plaintext stream using a second key.

Figure 36:
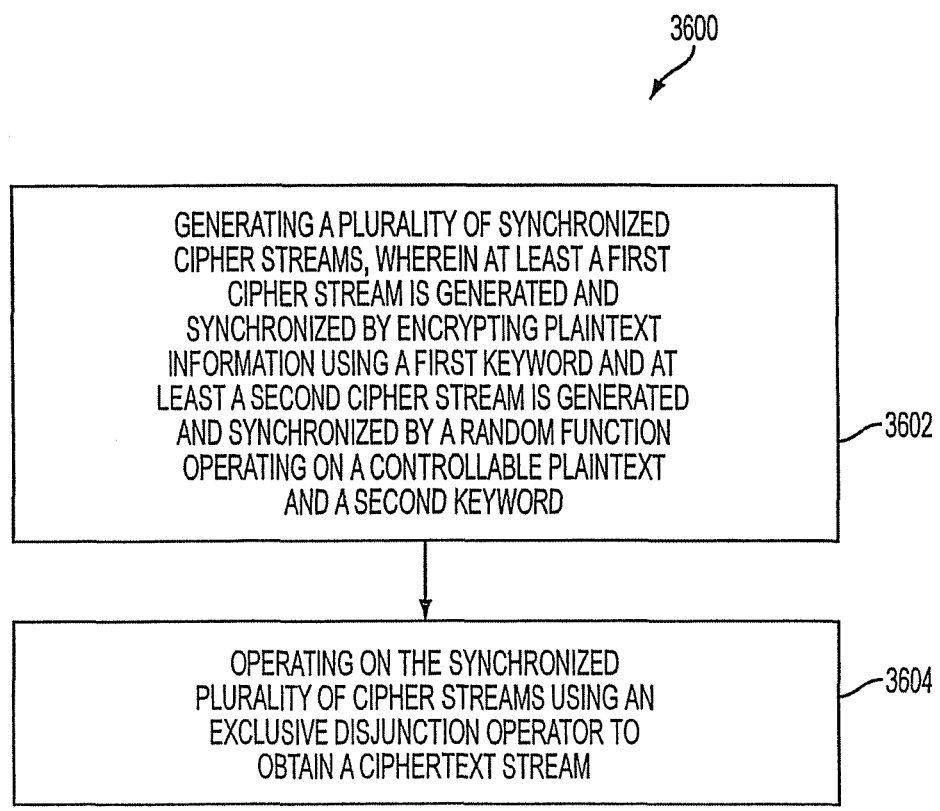
FIG. 36 is a flow chart illustrating operations in accordance with another method/computer readable medium with computer executable instructions for embodiments of the present invention.

As illustrated in FIG. 36, numeral 3600, in one embodiment of the present invention, the method/computer readable medium with computer executable instructions 3600 to encrypt plaintext information securely includes generating a plurality of synchronized cipher streams, wherein at least a first cipher stream is generated and synchronized by encrypting plaintext information using a first keyword and at least a second cipher stream is generated and synchronized by a random function operating on a controllable plaintext and a second keyword 3602; and operating on the synchronized plurality of cipher streams using an exclusive disjunction operator to obtain a ciphertext stream 3604.

As noted above, the present invention may also be embodied as computer readable codes on a computer readable recording medium. The computer readable recording medium is any data storage device that may store data, which may be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium may also be distributed over network coupled computer systems so that the computer readable code is stored and executed in a distributed fashion.

As illustrated in FIG. 14, numeral 1400, instead of generating a keystream from the key K as a traditional stream cipher did, the present invention generates two cipher streams $C^1$ and $C^2$. The final ciphertext stream 1410 is an output of a bitwise XOR operation of the two cipher streams $C^1$ and $C^2$. In one embodiment, the first cipher stream $C_1$ is generated by a block cipher E1 1414 with the original plaintext P 1416 and the first key K1 1418 and is synchronized using a synchronization unit S1 1412. Alternatively, the block cipher E1 1414 and the synchronization unit S1 1412 may be a combined unit. In one embodiment, the second cipher stream $C^2$ is generated by a controllable plaintext stream F 1402 with a random function R1 1404 and the second key K2 1406 and is synchronized using a synchronization unit S2 1408. Alternatively, the random function R1 1404 and the synchronization unit S2 1408 may be a combined unit. The final ciphertext C 1410 is obtained by using a bitwise (or character-by-character) XOR operation of $C^1$ and $C^2$.

Figure 15:
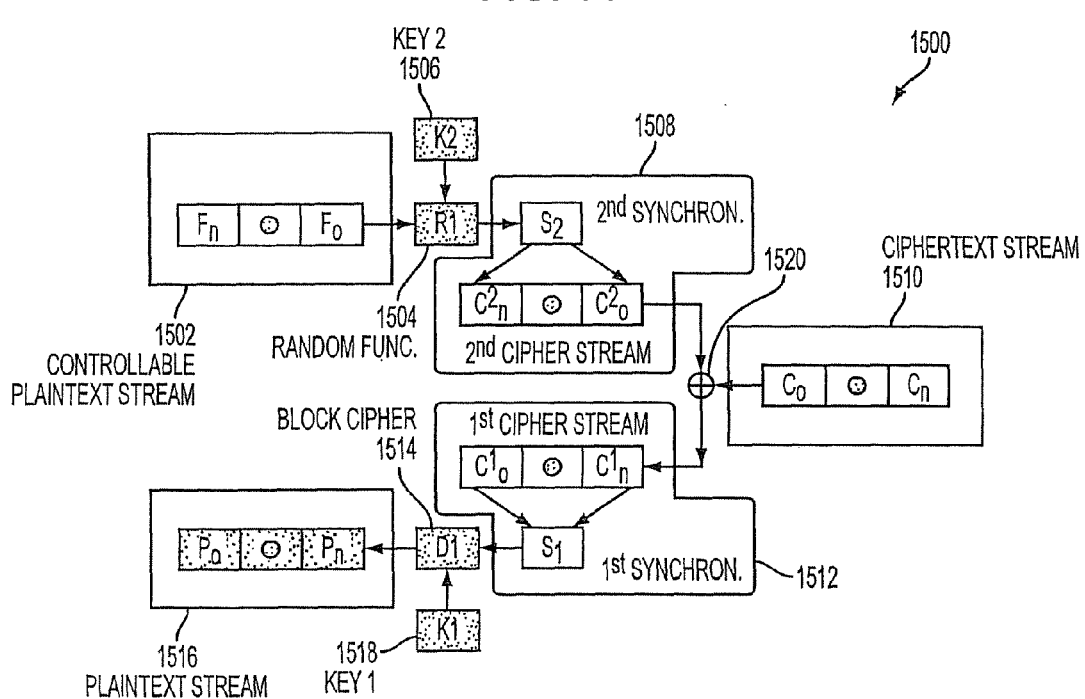
FIG. 15 is a block diagram representation of a device/data entry station to decrypt plaintext information securely in accordance with an embodiment of the present invention.

The operation of the decryption process, illustrated in FIG. 15, numeral 1500, is slightly different from the encryption. First, a second cipher stream $C_2$ 1508 must be generated, wherein the second cipher stream $C_2$ matches the second cipher stream $C_2$ of FIG. 14. For this, a controllable plaintext F 1502 that matches the controllable plaintext F 1402, a random function R1 1504 that matches the random function R1 1404, and a second key K2 1506 that matches the second key K2 1406 must be used. When this stream is available, the controllable plaintext F 1402 and the random function R1 1404 typically being transmitted separated from the transmitting agent to the receiving agent (wherein the second key K2 1406 is generally already known to the receiving agent, or may be prearranged to be received in a desired fashion), the next operation is to perform bitwise XOR with $C_2$ and the ciphertext C character-by-character. The output plaintext stream 1512 is the same as the first cipher stream $C^1$. This result is guaranteed by the following bitwise XOR operation:

$$C_i = C^1_i \text{ XOR } C^2_i => C_i \text{ XOR } C^2_i = C^1_i$$

Once the first cipher stream $C^1$ is generated, the original plaintext P 1416 is obtained by the decryption process D1 associated with the original choice of E1 1414 and key K1 1418.

The construction of the first cipher stream $C^1$ depends on P 1416 and the selections of the encryption device E1 1414 and the synchronization, which may be accomplished, if desired, by a separate synchronization device S1.

The first cipher stream $C^1$ is generated by block cipher E1 1414 with the original plaintext P 1416 and the first key K1 1418. For example, block ciphers such as DES, Tri-DES, and AES may be used as E1 1414. In fact, not just block cipher, but a stream cipher with a key or even an identity cipher (a straight through cipher, i.e., no-encryption at all) may be used as E1 1414. The secure feature of the ciphertext C 1510 does not depend on the choice of E1 1414. By suitable selection of the controllable plaintext F 1402, the secure feature of C 1510 is established. The only requirement for the choice of E1 1414 is that the encryption is reversible. In other words, the corresponding decryption device (or process) D1 exists with the same key, a different key, or even without any key involved.

The use of block cipher ensures that the first cipher stream $C^1$ is effective since block cipher produces an effective encryption. For a very effectively encrypted first cipher stream, a block cipher such as AES (Advanced Encryption Standard) may be utilized. For applications in which speed is important, a stream cipher such as RC4 may, for example, be used as E1.

The properties of the block cipher E1 1414 selected such as Block-Length (or Size) and Encryption Key-length directly impact the encryption process. The design of the synchronization process in S1 depends on the choices of E1 1414, S2 1405, and the header information H of the Ciphertext C. The function of S1 1405 is to ensure that the cipher stream $C^1$ is compatible with $C^2$, so that the entire decryption process is effectively maintained. In particular, when block cipher is used, the result will be output block-by-block. In this case, the most elementary function of the S1 1405 is to convert the block data into a stream (character-by-character). In one embodiment, the length of the $C^1$ (and/or P 1416) together with the stream information are also stored in a parameter called "Initial Vector (IV)". This IV will be used to provide update information for the S2 1508 so that the secure feature of C may be maintained.

Encryption usually includes processing a message down to the bit level. Computers store data in binary, a series of bits made up of 0s and 1s. The computer stores 8 of these bits in a structure called a byte. A big endian system stores the most significant value in the lowest numerical byte address and a little endian system does exactly the opposite, storing the least significant address in the lowest address. Operating Systems like Windows NT are little endian, and other OSes like HP-UX are big endian. Some programs not written in Java may use little-endian order, for example, C programs. Some platforms use big-endian order internally (Mac, IBM 390); some use little-endian order (Intel). Java hides that internal endianness. Java presumes that binary data is stored most significant byte first. Even if internally this is not so, Java completely hides that fact. All files it produces are big-endian, network order.

Converting data between the two endian systems is sometimes referred to as the NUXI problem. Imagine the word UNIX stored in two 2-byte words. In a big-endian system, it would be stored as UNIX. In a little-endian system, it would be stored as NUXI. Note that the example above shows only big- and little-endian byte orders. The bit ordering within each byte can also be big- or little-endian, and some architectures actually use big-endian ordering for bits and little-endian ordering for bytes, or vice versa.

When dealing with the internal computer architecture or systems, the "big-endian" and "little-endian" situations, big-endian and little-endian situations may need to be resolved. For example, a block cipher may be selected that uses a big-endian structure and the random device R1 1404 may be selected as a little-endian structure. In this case, the S1 1412 and S2 1408 devices are used to handle the compatibility problems. Also, if noise is introduced into the E1 1414 before P 1402, the noise data will be at the beginning of the $C^1$. In this case, a counting number or a string into the IV unit (see FIG. 16) may need to be output.

Figure 16:
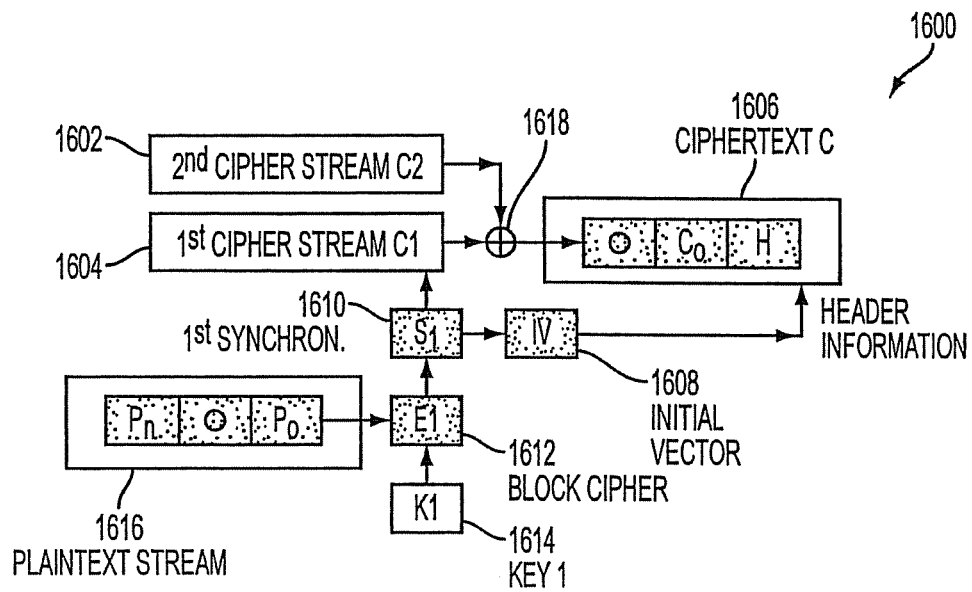
FIG. 16 is a block diagram representation of encrypting and outputting information of the IV unit as header information stored in the ciphertext C stream in accordance with an embodiment of the present invention.
Figure 17:
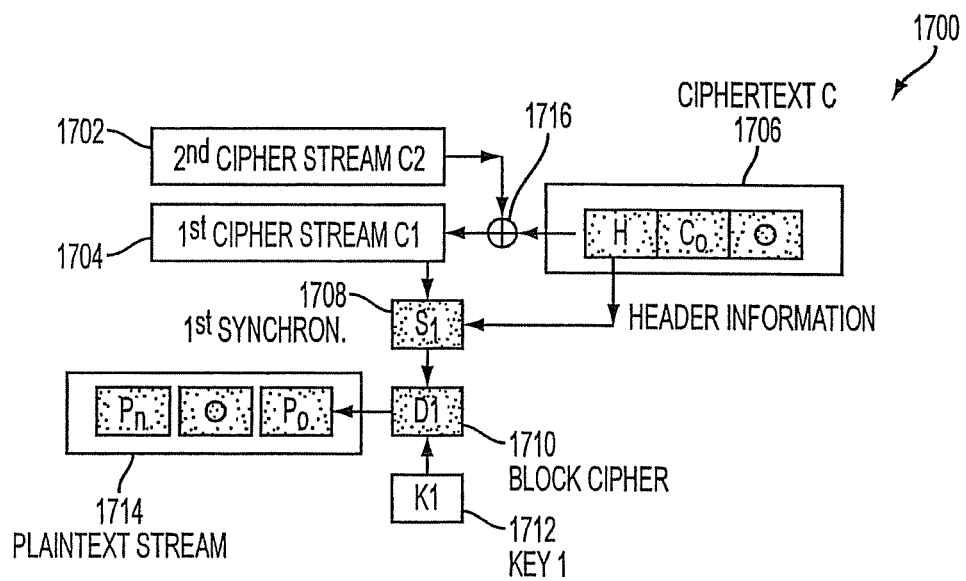
FIG. 17 is a block diagram representation of decrypting and outputting information of the IV unit as header information stored in the ciphertext C stream in accordance with an embodiment of the present invention.

The information of the IV unit 1608 is output as header information stored in the ciphertext C stream 1606, as illustrated in FIG. 16, numeral 1600. During the decryption process, the header information H will be input to S1 1410 so that the synchronization process will be performed properly, as illustrated in FIG. 17, numeral 1700.

Figure 18:
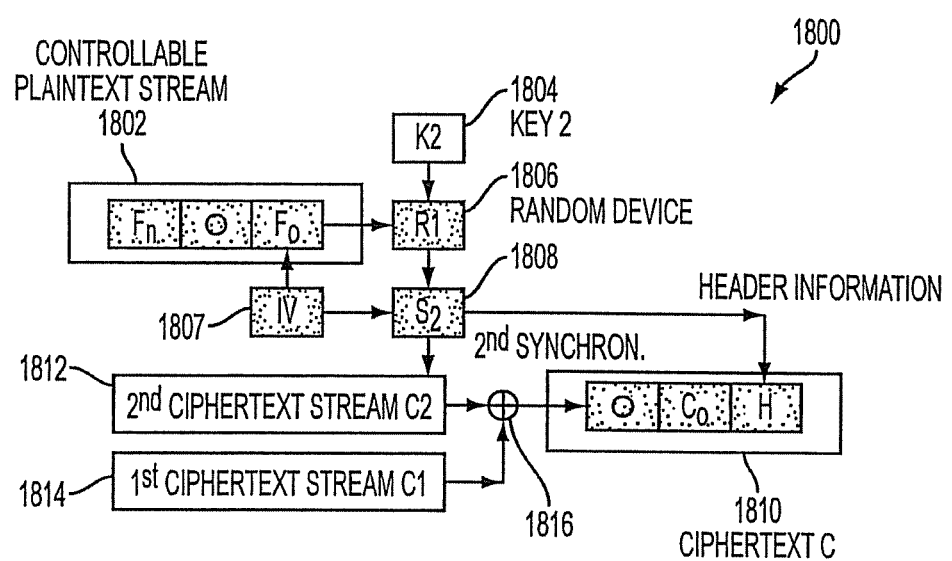
FIG. 18 is a block diagram representation of generating of the second cipher stream $C^2$ in accordance with one embodiment of the present invention.

As illustrated in FIG. 18, numeral 1800, generation of the second cipher stream $C^2$ depends on the controllable plaintext F1802, a random device R1 1806 (with a key K2 1804), a second synchronous device S2 1808, and an internal vector IV unit 1807. The main purpose of these devices is to make sure that $C^2$ as the cipher image of F 1802 is random and un-predictable. The character set of $C^2$ covers the complete set of bits. Also, the length of $C^2$ must be long enough to perform the bitwise XOR operation with the entire stream $C^1$.

In the embodiment illustrated in FIG. 18, numeral 1800, in order to produce a random and un-predictable cipher stream $C^2$, a controllable plaintext F 1802 is used. One of the primary choices of F 1802 is that F 1802 itself is a set of random (or pseudo-random) numbers. For example, F 1802 may be a set of random characters generated by a random number generator (RNG) or pseudo-random number generator (PRNG). For practical purposes, a printable character set such as (a-z)(A-Z)(0-9) is recommended so that F 1802 is editable and changeable by hand or an editor, such as, for example, notepad. To increase the un-predictability feature of F 1802, F should be changed frequently. Depending on the application, F 1802 should be long enough to generate multiple encryptions and short enough to maintain the efficiency and performance of the encryption. For example, the encryption is used for short messages (less than 600 characters), the size of F 1802 may be 2000-6000 characters.

The main function of the randomizing device R1 1806 is to use F 1802 as a controllable plaintext to produce a further randomized stream. Also, the character set of the stream should be full bits depending on the machine and operating platform. For example, for an n-bit platform, each character of the stream produced by the randomizing device R1 1806 should have equal (or near equal) probability combination of the n-bits.

For example, a suitable randomizing device R1 1806 may utilize a block or stream cipher such as DES, Tri-DES, CAST, IDEA, Blowfish/TwoFish, AES, RC4, ISAAC, or SEAL, which are efficient randomizers and bit-expansion methods for the corresponding plaintext. When a cipher is used for R1 1806, a key K2 1804 is automatically involved and occasionally, is not shown. The existence of a decryption feature of R1 1806 is not important. Also, the encryption used for R1 1806 may be the same or different from E1. For example, if AES is selected for E1, AES, RC4, or another cipher may be selected for R1. In many cases, a standard encryption may be modified with or without decryption and may still be used for R1.

When a cipher is used for R1 1806, the output format will be dictated by the cipher selected. For example, if a stream cipher is selected for R1 1806, the output will be a character stream. If a block cipher is used, the output will be packets in a block format. In either case, the output stream is input into the synchronous device S2 1808 to form a cipher stream $C^2$. It is the $C^2$ operating with $C^1$ that generates the final ciphertext C 1810. The function of S2 1808 is, therefore, to ensure that $C^2$ is compatible with C1 before the bitwise XOR.

To maintain the secure feature of the encryption, $C^2$ is different each time when the encryption is used. There are a number of ways to achieve that and two of them will be discussed below. One way to generate a different $C^2$ each time is by changing the starting index of F1802. For example, the initial vector IV unit 1807 may store the number k representing how many characters in F 1802 have been used in previous encryptions. When a new encryption is required, the (k+1) character stored in F 1802 will be input into the random (or cipher) device R1 1806. After the encryption, the IV unit 1807 is updated to store the next starting index. When the entirety of the controllable plaintext F 1802 has been used, the entire F 1802 may be replaced by a new controllable plaintext.

Another way to generate a different $C^2$ each time is by changing the starting index of $C^2$. For example, the IV unit 1807 may store the starting index k representing how many characters in $C^2$ have been used in previous encryptions. When a new encryption is required, the entire F 1802 is input into R1 1806. The synchronous device S2 1808 is used to count the output and discard the first k characters. The stream $C^2$ is formed from the (k+1) character. This operation is particular suitable for small messages P and F.

Figure 19:
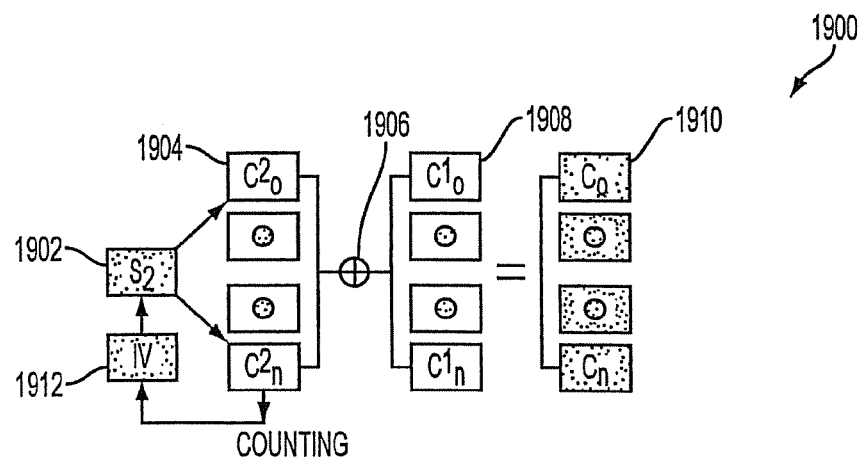
FIG. 19 is a block diagram representation of using an entire-stream mode to perform the bitwise XOR operation with streams $C^1$ and $C^2$ in accordance with an embodiment of the present invention.

The final operation for the encryption is to perform the bitwise XOR operation with streams $C^1$ and $C^2$. There are three operating modes that may be utilized for this process namely, entire-stream, character-by-character, and block-byblock. The operation of encrypting using an entire-stream mode, as illustrated in FIG. 19, numeral 1900, may be described as follows. When the 1st stream cipher $C^1$ is generated, the length of $C^1$ is passed to the device IV unit 1912. Based on the length, the $C^2$ with the same size is generated by the synchronizing unit S2 1902. The final XOR operation 1906 is carried out with the entire streams $C^1$ and $C^2$. This process is particularly suitable for encrypting short messages. One advantage of the entire-stream mode is that there is no synchronous feedback needed. When the entire plaintext P is known, the size of $C^1$ is fixed and so is the $C^2$. Thus, there is no need to monitor the streams $C^1$ and $C^2$ in real time. On the other hand, the entire-stream mode may only begin when the entire $C^1$ is generated and may not be desirable for use on some real-time applications that utilize real-time audio and video encryption, including police and military radio, broadcasting and transmission. From an operational point of view, entire-stream mode is a static operation.

Figure 20:
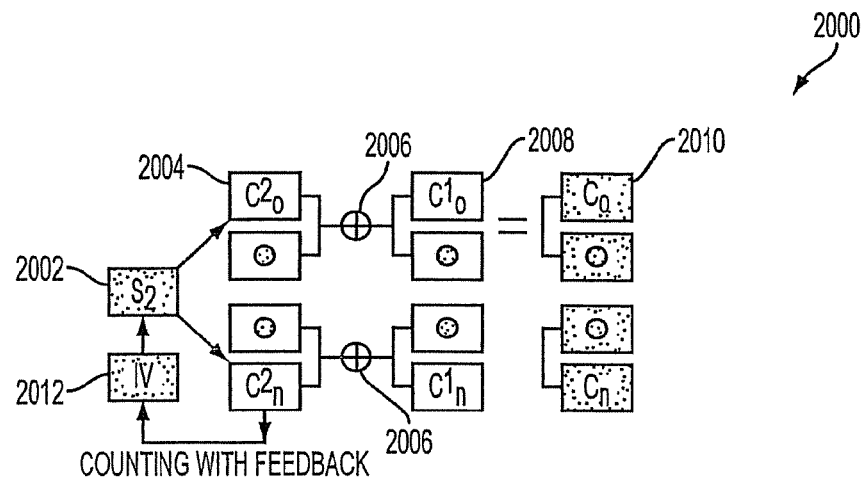
FIG. 20 is a block diagram representation of using a block-by-block mode to perform the bitwise XOR operation with streams $C^1$ and $C^2$ in accordance with an embodiment of the present invention.

In order to include real-time as well as static applications, as illustrated in FIG. 20, numeral 2000, a block-by-block mode may be used. The first operation in the block-by-block mode is to set up the block size, and then XOR the streams $C^1$ and $C^2$ block-by-block. Note that the block size in the block-by-block mode is not directly related to the block cipher used inside the encryption design and is device and operating system dependent. For example, for a 32/64 bit operating system or chip, using 32/64 bits as a block length, in many cases, is more efficient. When the block-by-block mode is used, the main function of the synchronous devices S1 and S2 2002 is to ensure that the streams $C^1$ and $C^2$ are grouped into an appropriate size before the XORing operation. In addition to this counting, the function of the S2 device 2002 also includes a real-time feedback to the IV device unit 2012 so that the process may be continued until the end of the encryption. For example, when a new block of $C^1$ is produced, the signal is sent to the IV device unit 2012. In this case, the counting feature in the IV device unit 2012 will be updated, and a new block from $C^2$ is requested. The newly generated two blocks will be XORed together to form a new block of ciphertext C 2010.

Figure 21:
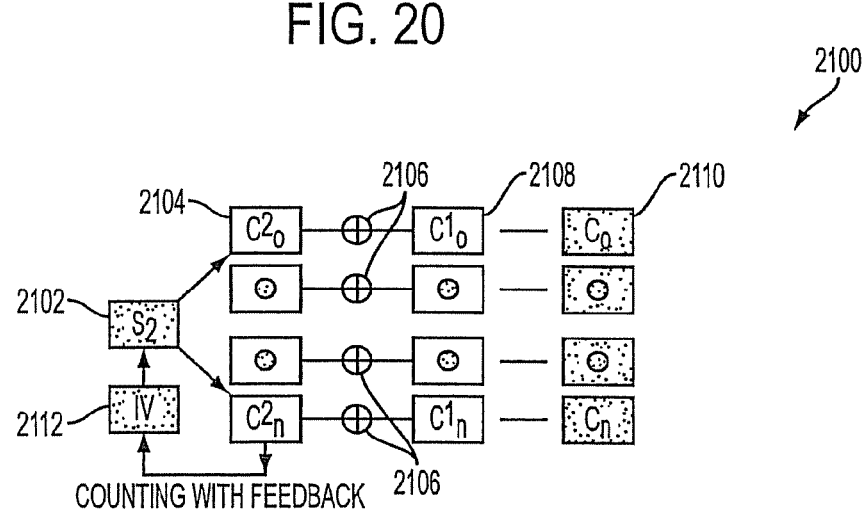
FIG. 21 is a block diagram representation of using a character-by-character mode to perform the bitwise XOR operation with streams $C^1$ and $C^2$ in accordance with an embodiment of the present invention.

For some applications and small devices, the entire-stream and/or block-by-block modes may not be the optimal way or feasible to implement the encryption. In this case, character-by-character mode may be used. In fact, the character-by-character mode may be considered as a special case of the block-by-block, wherein the block size is one. When the character-by-character mode is used, the cipher streams $C^1$ and $C^2$ are character-based. In this case, the main function of the synchronous devices S1 and S2 is simply to release the cipher streams one character at a time. Whenever a characters is generated from each of $C^1$ and $C^2$ respectively, the characters are XORed together to form one character of the ciphertext C, as illustrated in FIG. 21, numeral 2100. The function of the device IV 2112 is to increment the counting until the end of $C^1$. After the encryption, the length of the entire $C^1$ is stored in the IV device unit 2112 so that it may be used for the next encryption and to offset the cipher stream $C^1$ or the controllable plaintext F. The character-by-character mode is particularly suitable for real-time security applications using small devices with limited computational power and/or memory.

Figure 22:
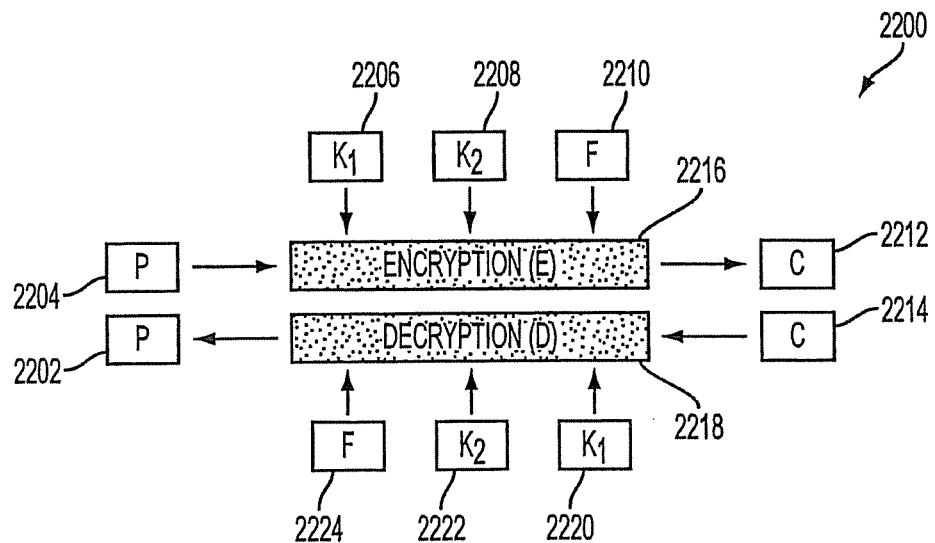
FIG. 22 is a block diagram representation of the inputs/outputs of the secure encryption/decryption of an embodiment of the present invention.

As illustrated in FIG. 22, numeral 2200, the operations of the secure encryption/decryption depend on the following five inputs/outputs namely, Plaintext (P) 2204, Ciphertext (C 2212 and 2214), a first password ($K_1$) 2206,2220, a second password ($K_2$) 2208,2222, and an independent password file (a controllable plaintext stream F 2210,2224). Generally, $K_1$ 2204,2220 and $K_2$ 2208,2222 may be memorable passwords. The password file F may be a random generated file containing a full spectrum of printable and/or non-printable characters. The combinations of the five inputs/outputs above form a range of functionalities across many security applications. Certain applications/embodiments are listed below. One of the most basic applications of the encryption is to deliver secure messages from one place to another.

Figure 23:
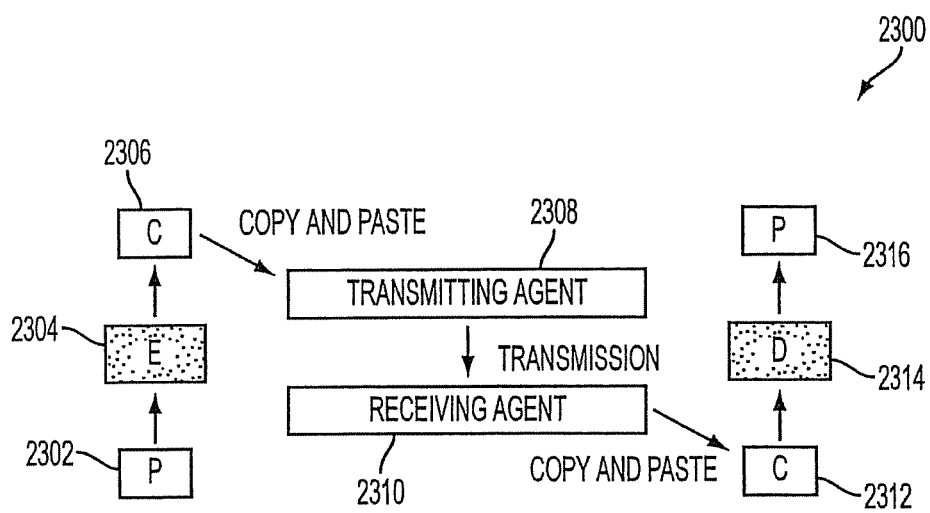
FIG. 23 is a block diagram representation of delivery of secure messages in accordance with an embodiment of the present invention.

As illustrated in FIG. 23, numeral 2300, the delivery of secure messages process may include assigning the parameters K1, K2, and F to user input and including the user input process for K1, K2 and F inside the encryption unit E 2304 and decryption unit D 2314, wherein the K1, K2, and F input by the user are transmitted to the receiving agent 2310 separately from the encryption process. The transmission may be any suitable method that delivers the ciphertext from one place to another, for example, email transmission, email attachment, Internet downloading, file transfer (FTP), by hand (via courier), mail, telephone, radio, or telegraph.

When the plaintext P is one of the following and in accordance with embodiments of the present invention, there is provided secure transmission for email messages, text messages, drawings and diagrams, photographs (including from satellites), music tracks (including locking CD's or DVD's), video, and various types of computer files and documents. For the last four items recited above, the input to the transmitting agent, sometimes, may be changed to printable or text format such as UU-encode or yEnc first, and then may be transmitted to the receiving agent. In fact, according to various embodiments of the invention, all kinds of plaintext format can be handled. It is the interface or transmitting agent, sometimes, that cannot handle the input format.

Figure 24:
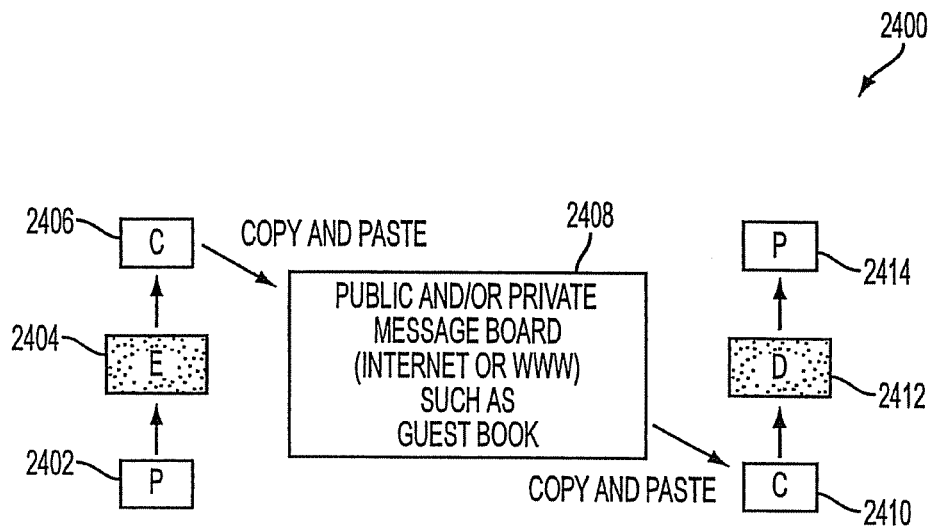
FIG. 24 is a block diagram representation of broadcasting a message on a public or private message board in accordance with an embodiment of the present invention.

To use the present invention in accordance with embodiments thereof, generally a receiving agent such as a recipient's email address is needed. However, as illustrated in FIG. 24, numeral 2400, if a receiving destination is not specifically designated, secure messages may be delivered by broadcasting the messages onto a public or private message board 2408. To broadcast a secure message, the ciphertext C may be pasted onto a corresponding public and/or private message board on the Internet 2408. For example, the secure message may be left in the so-called Guest Book of a public site or a private company site. Although the published message may be seen by anyone, the contents of the message are protected by the encryption. From a cryptology point of view, publication of the ciphertext does not reveal the secure message to unauthorized individuals. Only the intended person with the appropriate password and decryption may obtain the plaintext.

One advantage of the broadcasting method is that there will be no transmission to a particular party or destination and no time delay. An intended recipient may access the message from any location (that is appropriately connectable to the site to which the message is sent) and virtually at any time. The broadcast embodiment of the present invention is most useful for small messages and may not be convenient for instant or real-time discussion.

Figure 25:
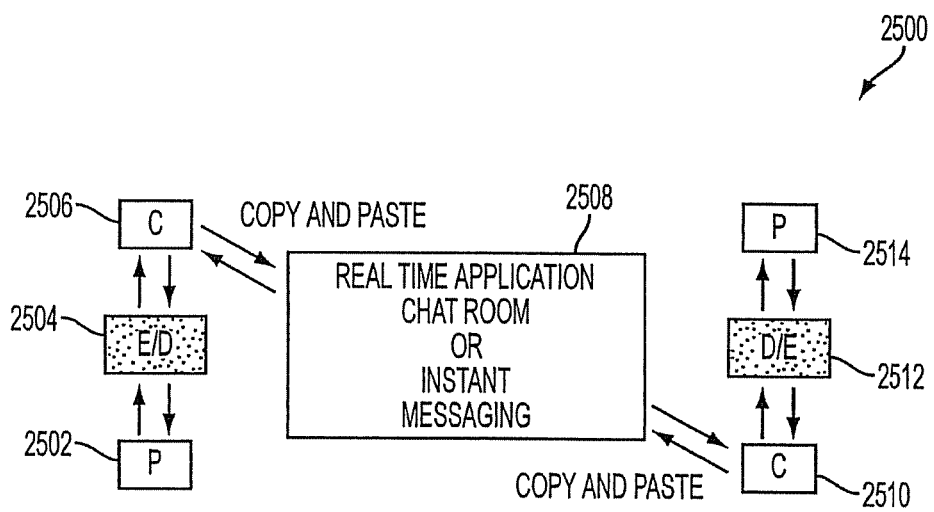
FIG. 25 is a block diagram representation of a real time application chat room or instant messaging in accordance with an embodiment of the present invention.

For a real-time secure discussion or chat, as illustrated in FIG. 25, numeral 2500, another embodiment of the present invention utilizing a two way construction (encryption & decryption), together with a chat room environment may be implemented. After opening a chat room, the ciphertext may be copied and pasted onto the chat room window with a partner.

This embodiment of the present invention provides real-time secure message exchange on any network environment, including a private network, local area network (LAN), and the Internet. All communication records will be saved automatically at the same time. The real-time secure discussion or chat provides for secure communications among parties or clients such as auction, tendering, buying and selling price, cost, a secure discussion with a banker and keeping all records, real time interactive military instructions such as defusing a bomb, various on-line consultancy such as buying a computer, real-time consultancy for on-line shopping, legal advice (wherein a reception area is a general chat room and all customers coming and going may be observed, and a consultant may email an instant message and use once K1, K2, and F sent to the client and open a private chat room to start the consulting work), instant, secure and open on-line banking (wherein the bank may service a large number of customers in the general chat room, and each individual customer can communicate with the associated banker in a private chat room), and instant, secure and open on-line business such as interactive ordering, buying, and paying. Generally, the instant exchanged messages would be small.

Figure 26:
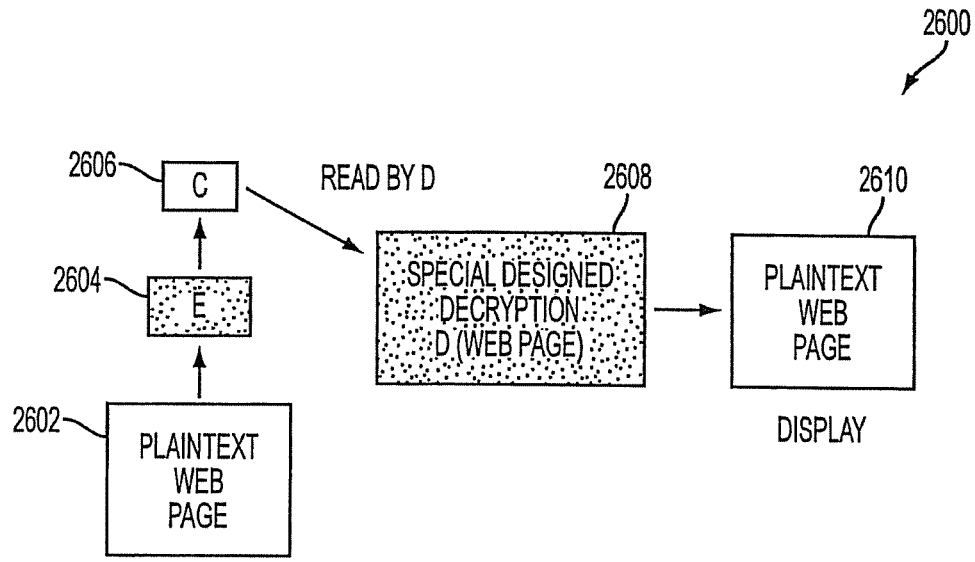
FIG. 26 is a block diagram representation of protecting contents of a web page in accordance with an embodiment of the present invention.

As illustrated in FIG. 26, numeral 2600, a Web page written by HTML and script may be encrypted similar to the encryption of ordinary text. In this case, the encrypted web page can be read by a specially designed decryption page as data. When the parameters K1,K2, and F are entered into the decryption page D 2608, the original Web page is obtained and may be displayed immediately on the screen. With the secure encryption of the present invention, the security of the encrypted Web page (as data) is ensured. When the K1, K2, and F are input to the decryption page D 2608, the original Web page will be displayed on the screen. To change to another Web page, another set of K1, K2, and F may be input, and the Web page may be encrypted again. This embodiment may be used for such applications as "Shares and Investment", "Horse Racing Tips", "Premium Jobs", and "Downloadable Songs", for example. By directly inputting the Web page into the encryption, the ciphertext data C may be readily generated. In one embodiment, parameters K1, K2, and F may be selected and emailed to users regularly as files so that the entire decryption process may be arranged automatically.

Figure 27:
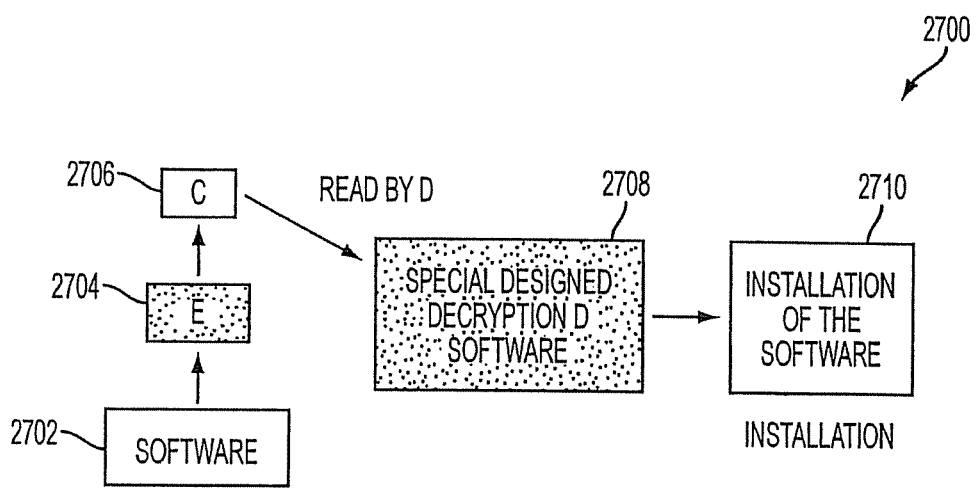
FIG. 27 is a block diagram representation of protecting software installation in accordance with an embodiment of the present invention.
Figure 28:
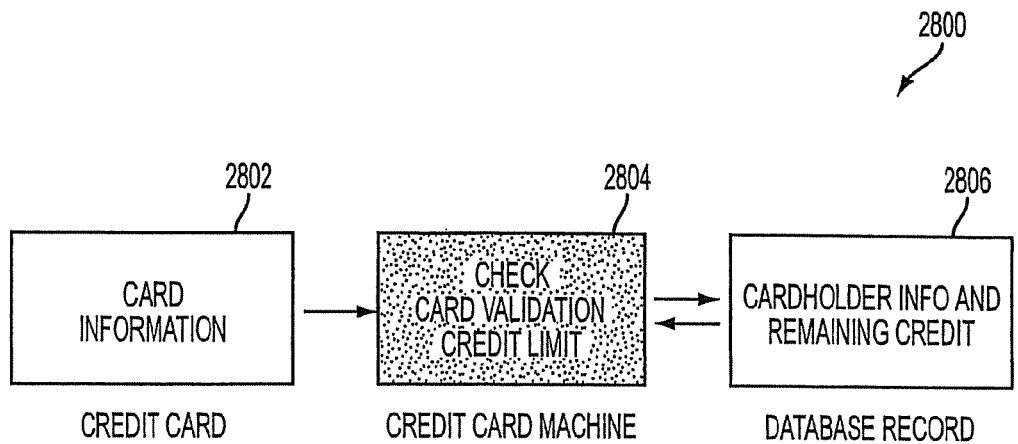
FIG. 28 is a block diagram representation of a credit card validation in accordance with an embodiment of the present invention.

As illustrated in FIG. 27, numeral 2700, in one embodiment, the present invention may be used to protect general software and installation. A specially designed decryption D software 2708 may be used to read the ciphertext data C 2706 and to then install the desired software 2710. However, such an embodiment does not identify who is accessing the software or store information on the length of time the software is utilized, making charging for the use of the software information difficult.

By re-arranging the input parameters P, K1, K2, F, and C, a secure charging facility may be created. Charging facilities such as the following may utilize the present invention according to various embodiments: credit card security, cash machine card security, access control, on-line banking, on-line shopping, and an on-line entertaining service provider.

In a credit card implementation, a credit card user is issued the credit card after approval from a provider (usually a bank) with a prenegotiated credit limit. When a purchase is made, the credit card user indicates a consent to pay, usually by signing a receipt with a record of the card details and indicating the amount to be paid. In many cases, an electronic verification system has been used which allows merchants (using a strip of magnetized material on the card holding information in a similar manner to magnetic tape T or a floppy disk) to verify that the card is valid and the credit card customer has sufficient credit at the time of purchase to complete the purchase or transaction.

However, there is very little security or even no security on credit cards. For example, the card validation check is basically checking the expiry date. When the credit card machine makes a request, the cardholder information and remaining credit are sent without further checking, specific credit card numbering and rules are open, and credit card information is readily copied, stolen and duplicated without the credit card owner's consent. When the database is illegally accessed by a hacker or an insider, all cardholder information and records are vulnerable. Card faults and crimes are committed easily on a large scale. There is evidence that organized crime is selling duplicated credit cards.

To provide a solution for credit card security problems, the secure encryption in accordance with embodiments of the present invention may be used to provide a powerful verification method to verify the validation of the card, a secure encryption for the card information, a secure encryption for the credit card database server, and limits financial damage when the card information is captured and/or duplicated by criminal merchants or illegally accessed during transmission. When the user applies for an account, the server may perform the following: based on the user information, select a plaintext P. This P may contain, for example, the cardholder name, starting and expiry date, credit card number, and other desired information; generate the remaining parameters K1, K2, and F according to the requirements of the user and/or the company, use all parameters P, K1, K2, and F to perform encryption to produce a ciphertext C; split the strings P, C, and F into two parts such as P=P1+P2, C=C1+C2, and F=F1+F2 (There is no specific requirement for the splitting), insert the information of P1, K1, F1, and C1 into the credit card, and insert the information P2, K2, F2, and C2 into the cardholder database record. For further security, any other information related to card holder, credit limit and remaining credit may be encrypted and stored into the cardholder database record.

Figure 29:
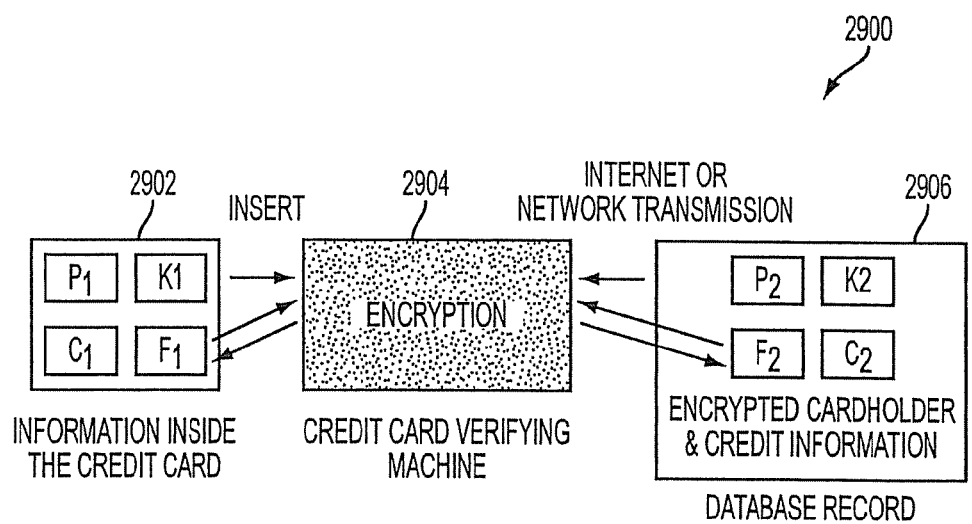
FIG. 29 is a block diagram representation of using a credit card verifying machine in accordance with an embodiment of the present invention.

As illustrated in FIG. 29, numeral 2900, a credit card verifying machine 2904 may utilize the present invention to secure a credit card transaction in accordance with embodiments thereof. When the credit card is inserted into the credit card verifying machine, the credit card verifying machine retrieves the P1, K1 and F1 from the credit card 2902 and the values P2, K1, K2, F2 from the database record 2906 to perform encryption. The encryption result is the ciphertext C. This newly created ciphertext C is used to verify the ciphertext $C^1$ (from credit card 2902) and $C^2$ (from the database record 2906) for verification. When the two ciphertexts are matched, the credit card validation is considered to be successful. After a successful verification, the encrypted credit information is sent to complete the transaction. After each visit (or certainly after a successful transaction), a new set of F is randomly generated and a new ciphertext C is obtained using the encryption. The information of F and C are divided into F1, C1, F2, and C2 and are stored back in the credit card 2902 of the user and the database record 2906 respectively for an update. Also, a new set of encrypted credit limit information is updated. All necessary previous records and the related transactions may be logged to build a history of the account of the credit card user. Hence, card duplication from the server information is impossible. All card checking and verifying are done in the card machine. All information transmission via the Internet or network are encrypted to eliminate network spying attacks such as "spyware" "Trojan Horse" or "Insider." Since the information C1, C2, F1, and F2 are changed after each usage, a duplicated card from the user card is worthless. For the same reason, after usage of a duplicated card, the original card will be invalid and therefore illegal activities of using duplicated cards can be monitored and detected more easily. In general, there is no user interaction for the credit card operation and therefore the credit card operation may be called a "Non-Interactive Operation."

Figure 30:
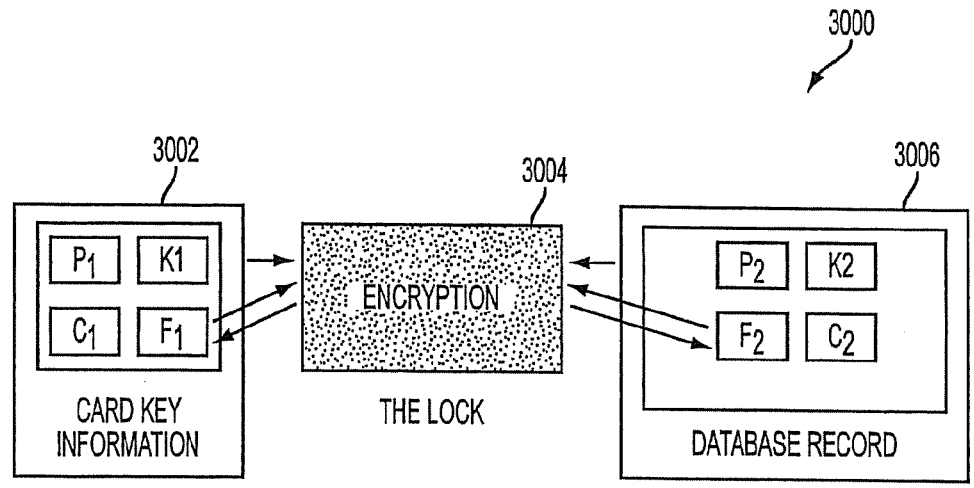
FIG. 30 is a block diagram representation of controlling a lock of a door and access to an area in accordance with an embodiment of the present invention.

As illustrated in FIG. 30, numeral 3000, the present invention in accordance with embodiments thereof may be utilized to control locks on doors and access to specified areas. Generally, a card key allows a person to open a door. The traditional access control method (encryption and verification) suffers from the same problems as a credit card, namely: lack of a powerful verification method to verify the legitimacy of the card key since card keys are easily to steal and duplicate, and a powerful method to guard the card key server against hacking (For example, it is well known that an intruder can illegally enter the database of the card key server to steal all key records and use stolen key/stolen key card information to gain access to any room). By using the secure encryption of the present invention, these above-cited problems may be prevented. As illustrated in FIG. 30, key card information includes $P_1$, K1, $C_1$, and $F_1$ 3002, a lock unit 3004 is used for encryption, and a database record includes $P_2$, K2, $F_2$ and $C_2$ 3006. When the key card is inserted into the lock, the verification process proceeds in accordance to the verification of the credit card process. Basically, if the encryption produces the same ciphertexts, the card key is considered to be valid and the door will open. Information C1, C2, F1, and F2 are changing and updated after each access. All necessary previous records and transactions may be logged to build a history of the account. When the server is hacked by organized crime or insiders, key duplication from the server record is prevented. Loss and duplicated keys are worthless since C and F change for each access. Lost and stolen keys may be replaced easily.

Figure 31:
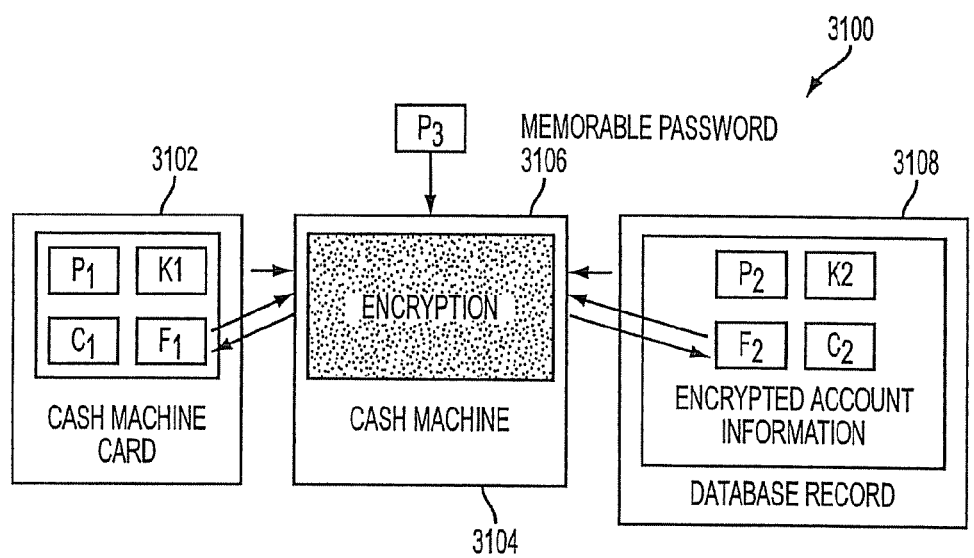
FIG. 31 is a block diagram representation of using a cash machine in accordance with an embodiment of the present invention.

As illustrated in FIG. 31, numeral 3100, a cash machine operation may also utilize the secure encryption according to embodiments of the present invention. Generally, a password, typically a memorable password, 3106 may be entered to activate the cash machine 3104 transaction. Cash machine security suffers from the same problem as in credit card application. Part of the plaintext P is extracted as in the credit card situation as the memorable password, i.e., P=P1+P2+P3. Generally, the parameter P3 should a relatively easy to remember number or string and is used to input the encryption when prompted. The parameters P1, K1, F1, and C1 are inserted into the cash machine card 3102. The parameters P2, K2, F2, and C2 are inserted into the database record 3108 of the bank. To improve the security further, the account and associated information may be encrypted by the same secure encryption or other selected methods. After each visit or certainly after each successful transaction, the parameters F1, F2, C1, and C2 are re-generated and updated in the card and database. The new account balance and other related information may be encrypted and updated so that the information is protected. All necessary previous records and transactions may be logged to build a history of the account. As with the credit card, the cash machine card and database record are protected by the secure encryption. When the server is illegally accessed by organized crime or insiders, the cash machine card duplication from the database record is impossible. A duplicated card is worthless since C and F are changing for each access. For the same reason, after usage of a duplicated card, the original card will be invalid, and therefore, illegal activities of using duplicated cards can be monitored and detected more easily. Lost and stolen keys may be replaced easily by changing the F1, F2, C1, and C2. The application is further protected by the memorable password.

Figure 32:
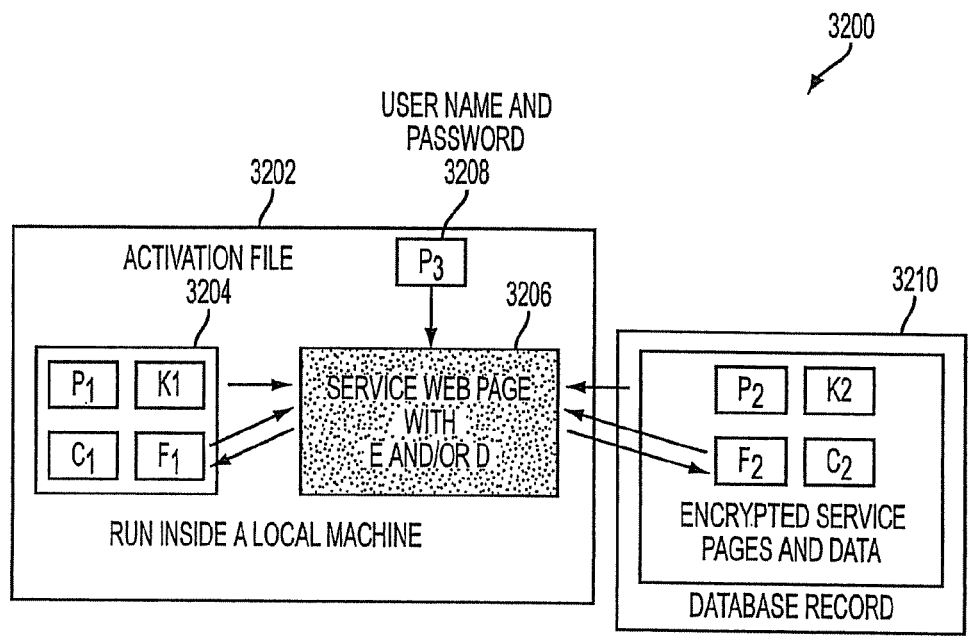
FIG. 32 is a block diagram representation of using an embodiment of the present invention in a charging industry on the Internet.

As illustrated in FIG. 32, numeral 3200, downloadable software from the Internet may be protected by the secure encryption according to embodiments of the present invention. The fixed E, K2, P2, F2 are inserted into the software in the database record 3210 and are protected by the executable code of the software. The verification process with encryption is included in the software installation. The software is then put onto the Internet 3206 for download. When the user registers the software in the authorized site, the parameters $P_1$, K1, $F_1$, and $C_1$ are generated (termed an "activation file" 3204) based on the encryption parameters inside the software 3202. The activation file 3204 is then sent to the registered user as email for authorized software installation. During the software installation, the activation file 3204 is requested and is input into the secure encryption. When the parameters P1, P2, K1, K2, F1, F2 and the encryption E produce the same ciphertext C as in the activation file 3204, the software installation continues and installation is considered to be successful. For different registered users, P1, K1, F1, and C may be different, so that each user has a proper registered version of the software. To further protect the software, sometimes, a user password P3 may be extracted from P1 as a software activation code and provided to the Service Web Page 3206 so that an interactive parameter is also needed for the software installation. All necessary previous records and transactions may be logged to build a history of the account.

The secure encryption, in accordance with embodiments of the present invention, may be used for charging industries on the Internet. For example, the secure encryption may be used when a user applies for an account by filling out forms, a service provider sets up the user account in the database, and instead of the usual "User Name" and "Password", the provider sends the activation file as email to the registered user at the same time. Based on the username, password, and the activation file, the user may log onto the service site via the encryption process as described above. The user downloads and runs the service page on the local machine 3202. The information of the activation file 3202 is read by the service page 3206 automatically. The user inputs the user name and password P3 3208 into the service page 3206 so that secure encryption may be performed. After the user authentication, encrypted service data and/or Web pages are sent by the database record 3210 to the local machine 3202 for decryption and providing services to the customer.

For further protection, the P3 may include fingerprint or other bio-metric information. For portability of the application, the activation file may be stored as a memory stick. Applications include use by an Internet Service Provider (ISP) such as American On-line (AOL), job hunting, a dating agency, an Internet TV, and a broadband telephone.

Figure 33:
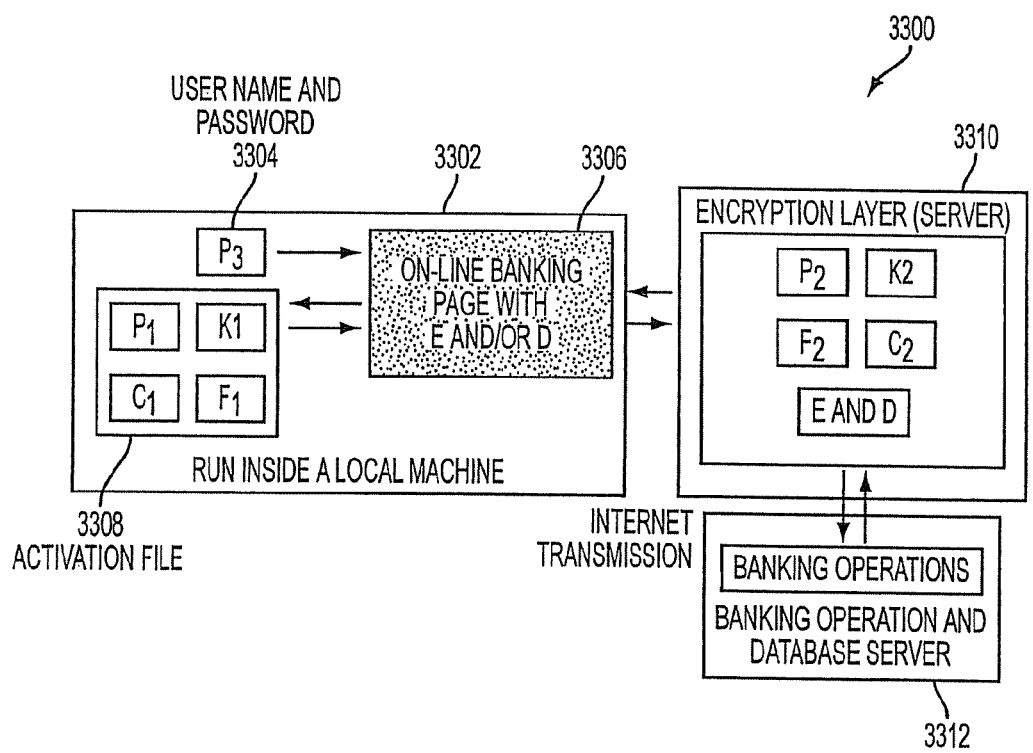
FIG. 33 is a block diagram representation of using an embodiment of the present invention in on-line banking.

As illustrated in FIG. 33, numeral 3300, the secure encryption, in accordance with embodiments of the present invention, may be utilized in on-line banking. Since most on-line banking systems have a banking operation and database server, the secure encryption may added to present protective programs to form an encryption layer in the database server. The banking operation and database server should be physically protected against unauthorized access and should not connect to the Internet directly. The banking accounts and related information should be encrypted by the encryption layer before transmitting to the banking page via the Internet or the network environment. The user downloads and runs 3302 the on-line banking page 3306 on the local machine. The information of the activation file 3308 is read by the banking page 3306 automatically. Together with the user name and password P3 3304 to the banking page, the secure encryption is performed for user authentication. After the user authentication, encrypted banking operations 3312 are sent to the encryption layer 3310 for decryption. The decrypted banking information is then sent to the banking operation and database server 3312 for the actual banking action. To increase the portability of the on-line banking, the activation file may be stored in a local machine, a memory stick, and/or any portable storage devices such as a hard disk or CD. To increase the security, P3 or the activation file may include bio-metric information such as fingerprints. Adding an encryption layer will keep all existing on-line banking operation un-changed so that modifications are kept to minimum.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of encrypting plaintext information securely in a credit card, the method comprising:

selecting, from a server/database record, a plaintext P based on user information when a user applies for an account;

generating, by the server/database record a first key, a second key and a controllable plaintext stream according to requirements of the user and/or a company providing the credit card;

using, by the server/database record, the plaintext P, the first key, the second key, and the controllable plaintext stream to provide a secure encryption scheme to perform encryption to produce a ciphertext C;

sending the first key to a cardholder;

inserting the ciphertext C into the credit card and sending the credit card to the cardholder;

inserting the plaintext P, the second key, and the controllable plaintext stream into a cardholder database record;

decrypting the ciphertext C using the first key, the second key, and the controllable plaintext stream to produce a decrypted plaintext;

comparing the decrypted plaintext to the plaintext P;

authorizing a transaction of the user if the decrypted plaintext is equal to the plaintext P;

denying the transaction of the user if the decrypted plaintext is not equal to the plaintext P and reporting that the card may have been duplicated;

generating a new controllable plaintext stream and storing the new controllable plaintext stream into the cardholder database record;

encrypting the plaintext P using the new controllable plaintext stream, the first key, and the second key to produce a new ciphertext C; and inserting the new ciphertext C into the credit card.

* * * * *